(12) United States Patent
Sridharan et al.

(10) Patent No.: US 12,200,708 B2
(45) Date of Patent: Jan. 14, 2025

(54) TIMELINES FOR UPLINK CONTROL INFORMATION MULTIPLEXING OVER MULTIPLE SLOT TRANSMISSIONS

(71) Applicant: QUALCOMM Incorporated, San Diego, CA (US)

(72) Inventors: Gokul Sridharan, Sunnyvale, CA (US); Seyedkianoush Hosseini, San Diego, CA (US); Hung Dinh Ly, San Diego, CA (US); Wei Yang, San Diego, CA (US); Yi Huang, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 380 days.

(21) Appl. No.: 17/656,209

(22) Filed: Mar. 23, 2022

(65) Prior Publication Data
US 2022/0322336 A1      Oct. 6, 2022

Related U.S. Application Data

(60) Provisional application No. 63/166,961, filed on Mar. 26, 2021.

(51) Int. Cl.
*H04W 72/21*     (2023.01)
*H04L 1/1812*    (2023.01)
*H04W 72/0446*   (2023.01)
*H04W 72/542*    (2023.01)

(52) U.S. Cl.
CPC .......... *H04W 72/21* (2023.01); *H04L 1/1812* (2013.01); *H04W 72/0446* (2013.01); *H04W 72/542* (2023.01)

(58) Field of Classification Search
None
See application file for complete search history.

(56) References Cited

U.S. PATENT DOCUMENTS

| | | | |
|---|---|---|---|
| 2021/0092762 A1* | 3/2021 | Choi | H04L 1/1854 |
| 2022/0279538 A1* | 9/2022 | Jung | H04L 5/0044 |

FOREIGN PATENT DOCUMENTS

| | | |
|---|---|---|
| EP | 3591888 A1 | 1/2020 |
| EP | 3691387 A1 | 8/2020 |
| EP | 3793114 A1 | 3/2021 |

OTHER PUBLICATIONS

International Search Report and Written Opinion—PCT/US2022/021807—ISA/EPO—Jul. 14, 2022.

\* cited by examiner

*Primary Examiner* — Minh Trang T Nguyen
(74) *Attorney, Agent, or Firm* — QUALCOMM Incorporated

(57) ABSTRACT

A method, a computer-readable medium, and an apparatus are provided for wireless communication. The apparatus applies a processing timeline for multiplexing uplink control information (UCI) in at least one slot of a multiple slot physical uplink shared channel (PUSCH) transmission. The apparatus transmits the multiple slot PUSCH transmission with multiplexed UCI based on the processing timeline being satisfied.

30 Claims, 28 Drawing Sheets

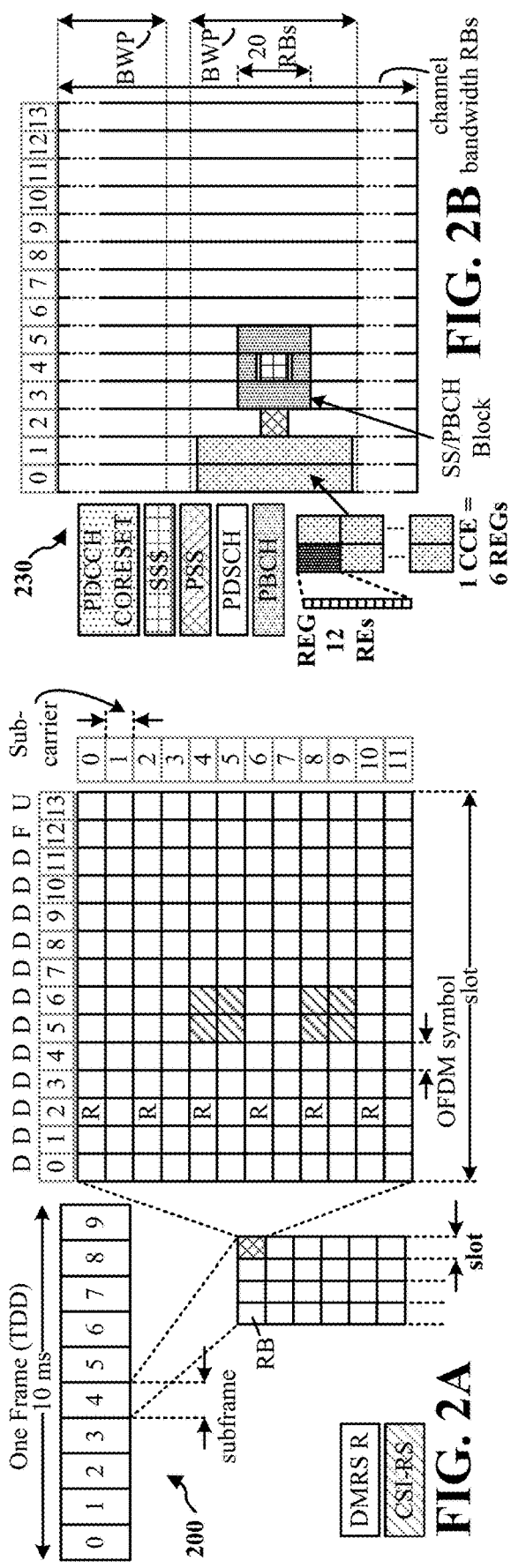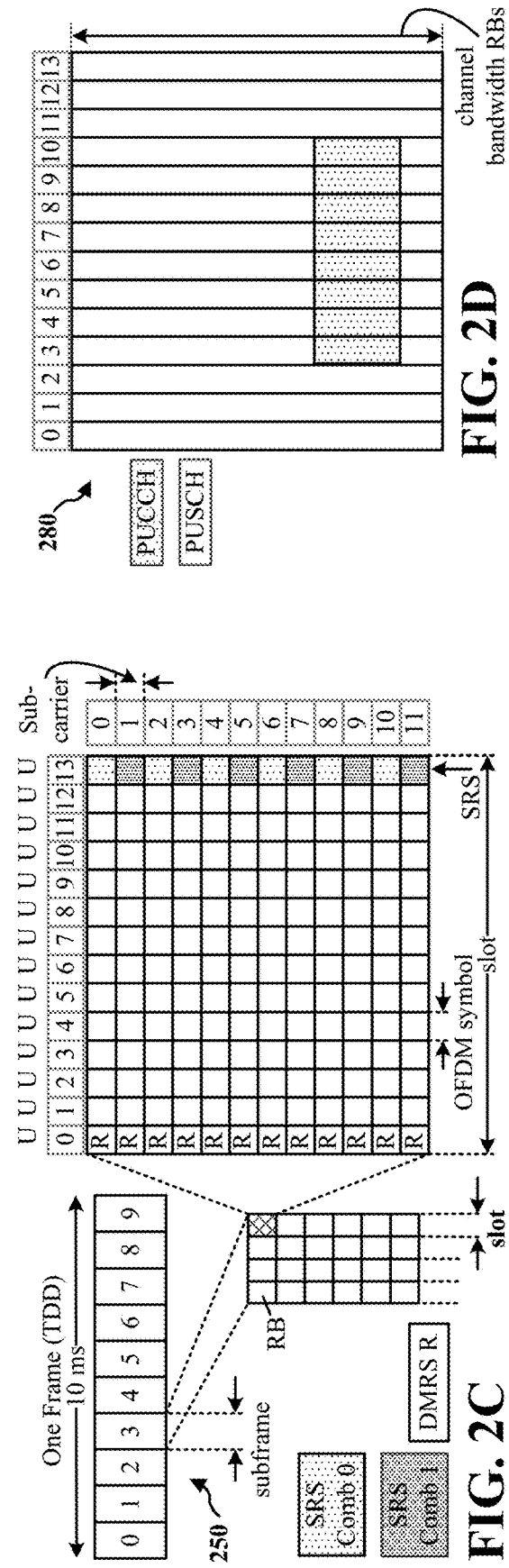

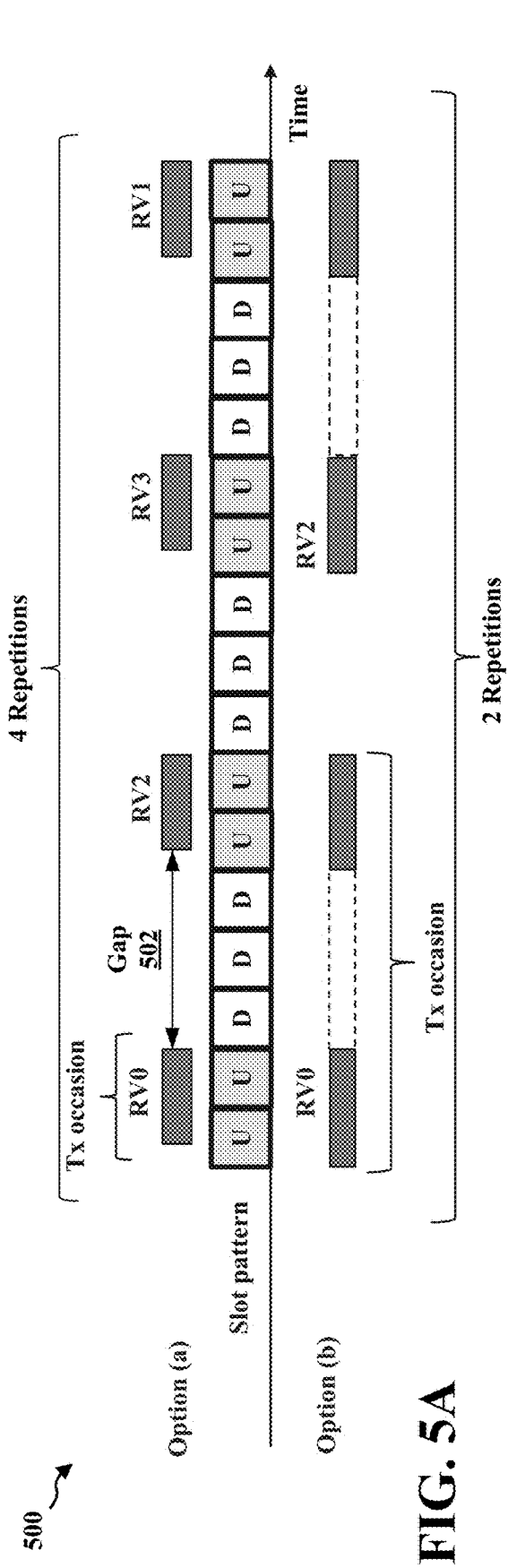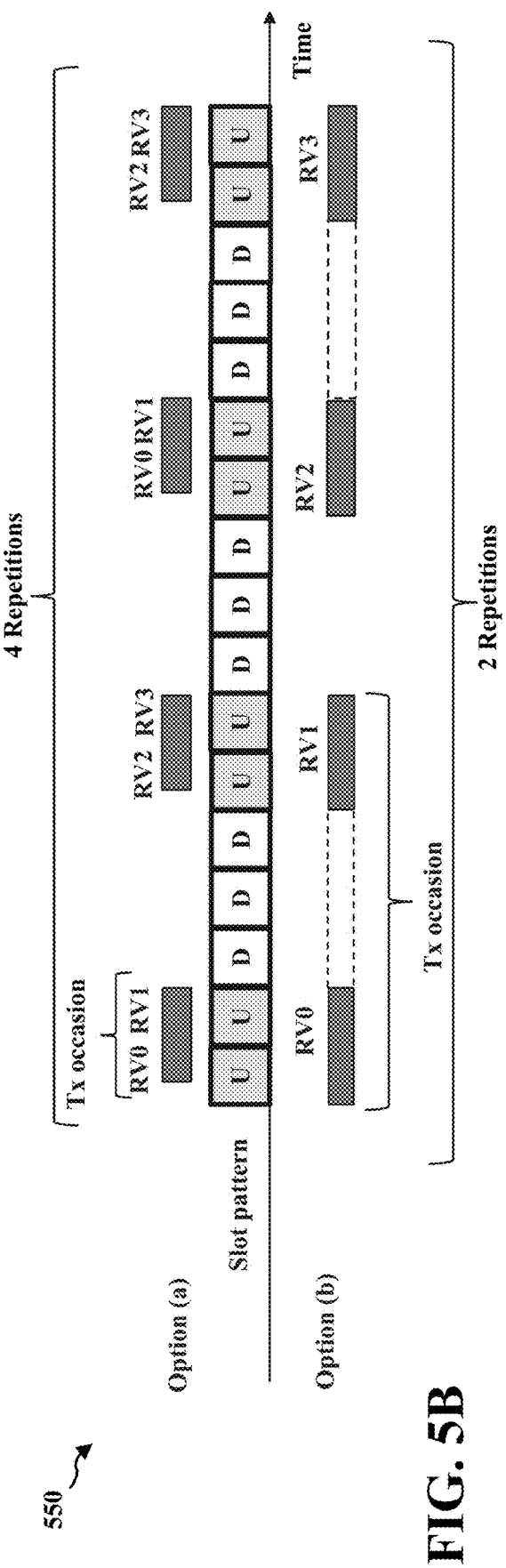

TIMELINES FOR UPLINK CONTROL INFORMATION MULTIPLEXING OVER MULTIPLE SLOT TRANSMISSIONS

CROSS REFERENCE TO RELATED APPLICATION(S)

This application claims the benefit of and priority to U.S. Provisional Application Ser. No. 63/166,961, entitled "Timelines for Uplink Control Information Multiplexing Over Multiple Slot Transmissions" and filed on Mar. 26, 2021, which is expressly incorporated by reference herein in its entirety.

TECHNICAL FIELD

The present disclosure relates generally to communication systems, and more particularly, to wireless communication include uplink control information (UCI).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus applies a processing timeline for multiplexing uplink control information (UCI) in at least one slot of a multiple slot physical uplink shared channel (PUSCH) transmission. The apparatus transmits the multiple slot PUSCH transmission with multiplexed UCI based on the processing timeline being satisfied.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

FIGS. 5A and 5B illustrate example aspects of redundancy version (RV) cycling for multiple transmissions occasions of a multiple slot PUSCH, in accordance with various aspects of the present disclosure.

DETAILED DESCRIPTION

Figure 1:
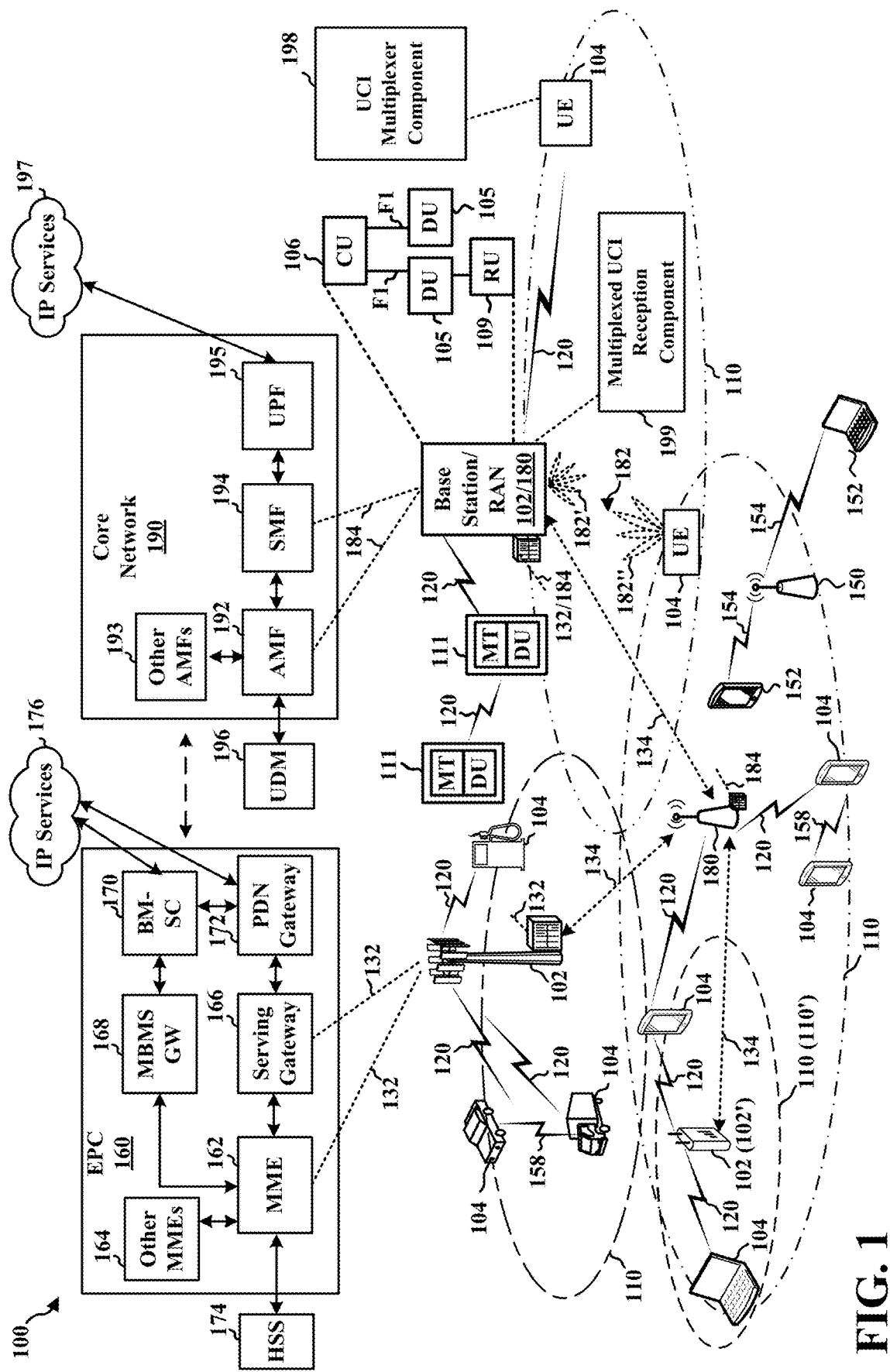
FIG. 1 is a diagram illustrating an example of a wireless communications system and an access network, in accordance with various aspects of the present disclosure.

A UE may transmit a PUSCH over a transmission occasion spanning multiple slots. The UE may transmit a single TB within the multiple slots of the transmission occasion. At times, the UE may have uplink control information (UCI) for transmission in a physical uplink control channel (PUCCH) that overlaps in time with the transmission occasion for the PUSCH. Based on the overlap in time, the UE may multiplex the UCI with the PUSCH. Aspects presented herein provide various ways for the UE to multiplex the UCI with the multiple slot PUSCH. The multiplexing aspects including any combination of the number of resources for the UCI, the location for the UCI, the handling of the multiplexing, timelines, the rate matching of the PUSCH, and/or the interleaving of the PUSCH may vary based on a type of transmission occasion (e.g., contiguous or non-contiguous. The multiplexing aspects may vary based on the slot of the PUSCH transmission occasion that is overlapped. The multiplexing aspects may vary based on the type of PUSCH handling, e.g. per slot, per transmission occasion, or per segment interleaving and RV cycling.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Aspects described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described aspects may occur. Implementations may range a spectrum from chip-level or modular components to non-modular, non-chip-level implementations and further to aggregate, distributed, or original equipment manufacturer (OEM) devices or systems incorporating one or more aspects of the described aspects. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that aspects described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100 include base stations 102 or 180 and UEs 104. As described herein, a UE 104 may include a UCI multiplexer component 198. In some aspects, the UCI multiplexer component 198 may be configured to apply a timeline for multiplexing UCI in at least one slot of a multiple slot PUSCH transmission. The UE 104 may be configured to transmit the multiple slot PUSCH transmission with the multiplexed UCI based on the processing timeline being satisfied. The base station 102 or 180, or a component of the base station, may include a multiplexed UCI reception component 199. The base station 102 or 180, or the component of the base station, may allocate resources to the UE 104 for a multiple slot PUSCH transmission. In some aspects, the multiplexed UCI reception component 199 may be configured to receive the multiple slot PUSCH transmission comprising UCI multiplexed in at least one slot of the multiple slot PUSCH transmission based on a processing timeline for UCI multiplexing. Although the following description may be focused on 5G NR, the concepts described herein may be applicable to other similar areas, such as LTE, LTE-A, CDMA, GSM, and other wireless technologies.

The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184 (e.g., an Xn interface), and the third backhaul links 134 may be wired or wireless.

In some aspects, a base station 102 or 180 may be referred as a RAN and may include aggregated or disaggregated components. As an example of a disaggregated RAN, a base station may include a central unit (CU) 106, one or more distributed units (DU) 105, and/or one or more remote units (RU) 109, as illustrated in FIG. 1. A RAN may be disaggregated with a split between an RU 109 and an aggregated CU/DU. A RAN may be disaggregated with a split between the CU 106, the DU 105, and the RU 109. A RAN may be disaggregated with a split between the CU 106 and an aggregated DU/RU. The CU 106 and the one or more DUs 105 may be connected via an F1 interface. A DU 105 and an RU 109 may be connected via a fronthaul interface. A connection between the CU 106 and a DU 105 may be referred to as a midhaul, and a connection between a DU 105 and an RU 109 may be referred to as a fronthaul. The connection between the CU 106 and the core network may be referred to as the backhaul. The RAN may be based on a functional split between various components of the RAN, e.g., between the CU 106, the DU 105, or the RU 109. The CU may be configured to perform one or more aspects of a wireless communication protocol, e.g., handling one or more layers of a protocol stack, and the DU(s) may be configured to handle other aspects of the wireless communication protocol, e.g., other layers of the protocol stack. In different implementations, the split between the layers handled by the CU and the layers handled by the DU may occur at different layers of a protocol stack. As one, non-limiting example, a DU 105 may provide a logical node to host a radio link control (RLC) layer, a medium access control (MAC) layer, and at least a portion of a physical (PHY) layer based on the functional split. An RU may provide a logical node configured to host at least a portion of the PHY layer and radio frequency (RF) processing. A CU 106 may host higher layer functions, e.g., above the RLC layer, such as a service data adaptation protocol (SDAP) layer, a packet data convergence protocol (PDCP) layer. In other implementations, the split between the layer functions provided by the CU, DU, or RU may be different.

An access network may include one or more integrated access and backhaul (IAB) nodes 111 that exchange wireless communication with a UE 104 or other IAB node 111 to provide access and backhaul to a core network. In an IAB network of multiple IAB nodes, an anchor node may be referred to as an IAB donor. The IAB donor may be a base station 102 or 180 that provides access to a core network 190 or EPC 160 and/or control to one or more IAB nodes 111. The IAB donor may include a CU 106 and a DU 105. IAB nodes 111 may include a DU 105 and a mobile termination (MT). The DU 105 of an IAB node 111 may operate as a parent node, and the MT may operate as a child node.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNB s) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). The description applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS<br>$\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu *15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology 1.1=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
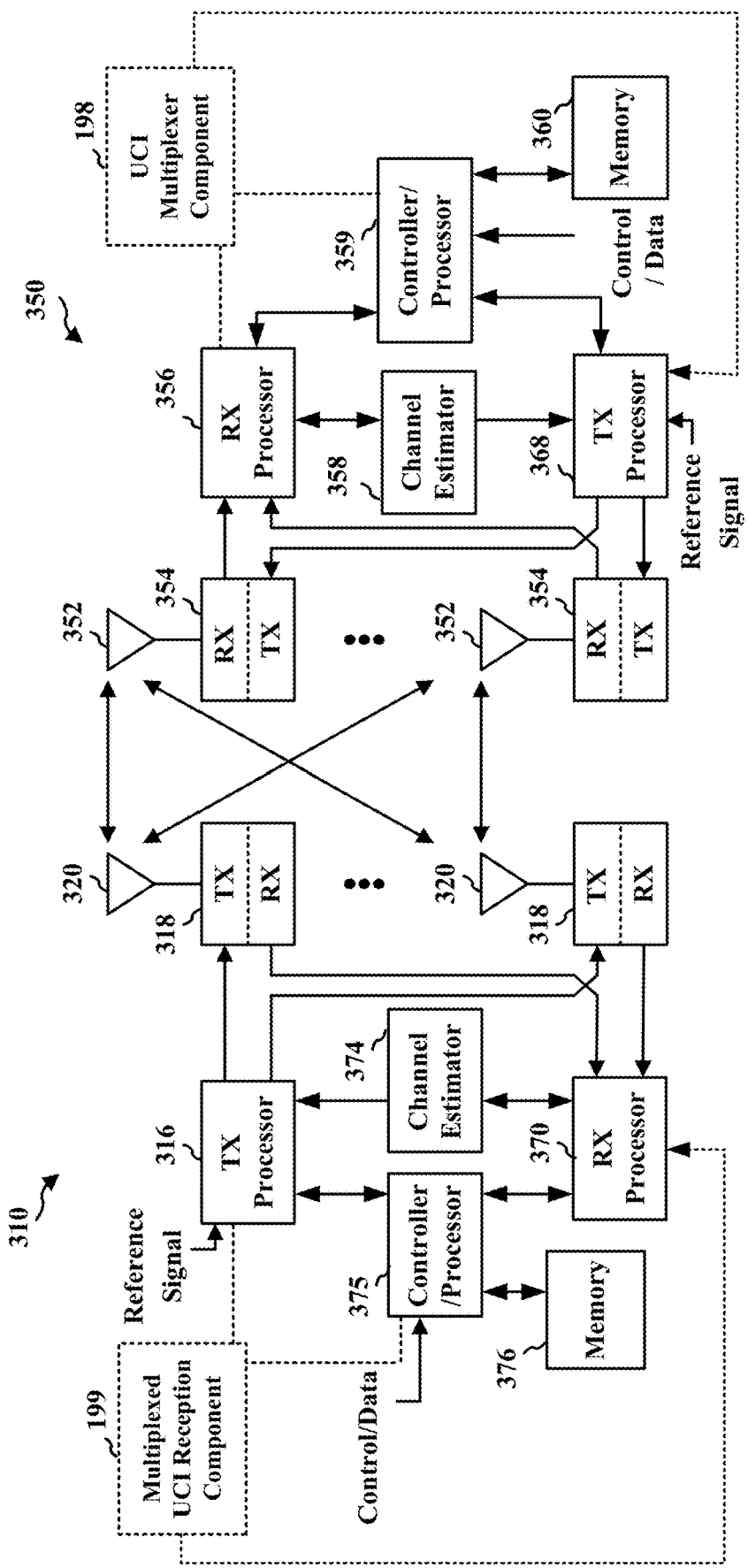
FIG. 3 is a diagram illustrating an example of a base station and user equipment (UE) in an access network, in accordance with various aspects of the present disclosure.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354 TX. Each transmitter 354 TX may modulate an RF carrier with a respective spatial stream for transmission.

The UL transmission is processed at the base station 310 in a manner similar to that described in connection with the receiver function at the UE 350. Each receiver 318 RX receives a signal through its respective antenna 320. Each receiver 318 RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the UCI multiplexer component 198 of FIG. 1.

At least one of the TX processor 316, the RX processor 370, and the controller/processor 375 may be configured to perform aspects in connection with the multiplexed UCI reception component 199 of FIG. 1.

Figure 4:
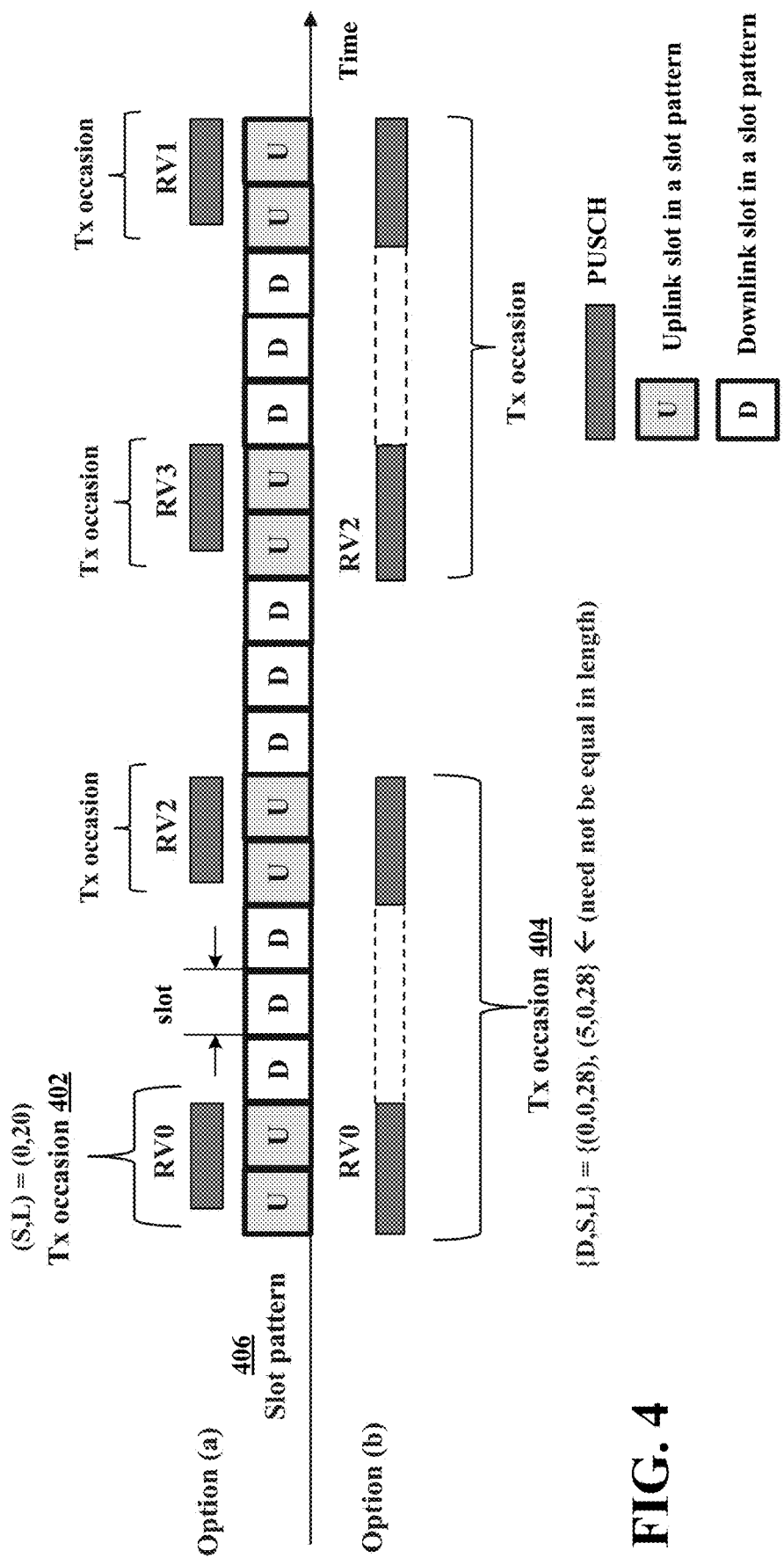
FIG. 4 illustrates a diagram showing various options of transmission occasions for multiple slot PUSCH transmissions, in accordance with various aspects of the present disclosure.

A PUSCH may be transmitted across multiple slots as a multiple slot PUSCH transmission. The PUSCH transmission may span multiple transmission occasions. The transmission occasion may include uplink resources, e.g., uplink slots, with resources allocated to the UE for transmission of the PUSCH. FIG. 4 illustrates a diagram 400 showing two different options for multiple slot PUSCH transmissions. FIG. 4 also illustrates an example slot pattern 406, e.g., a TDD uplink/downlink slot pattern. In a first option, e.g., shown as option (a) in FIG. 4, each transmission occasion of the multiple slot PUSCH transmission includes contiguous resources (e.g., contiguous symbols or contiguous slots) spanning one or more slots, e.g., as shown for transmission occasion 402. In some aspects, the contiguous resources may include contiguous symbols that extend into two different slots. FIG. 4 illustrates that the contiguous resources of each transmission occasion may be separated by resources that are not part of the PUSCH transmission, such as downlink slots. In a second option, e.g., shown as option (b) in FIG. 4, each transmission occasion may include non-contiguous resources. The non-contiguous resources may include multiple sets of contiguous resources, as shown for the transmission occasion 404.

A time domain resource allocation (TDRA) of a multiple slot PUSCH transmission occasion provides the set of consecutive or nonconsecutive symbols of the transmission occasion. For a transmission occasion of contiguous resources, e.g., option (a) in FIG. 4, the TDRA may be indicated as a pair of a starting symbol (S) for the contiguous resources and a length (L) of the contiguous resources of the transmission occasion, e.g., a pair (S,L). FIG. 4 illustrates an example of (S,L)=(0,20) to illustrate the concept. S=0 may correspond to a first symbol of an uplink slot of an uplink grant, and L=20 may correspond to a length of 20 symbols. For a transmission occasion of non-contiguous resources, e.g., option (b) in FIG. 4, the TDRA may be indicated as a triplet of (D, S, L), wherein D further indicates a slot index relative to a reference slot. The reference slot may be the slot in which the UE receives the DCI with the uplink grant from the base station. The reference slot may be a slot indicated by the DCI as a beginning of the transmission occasion, which may be referred to by a parameter K2. FIG. 4 illustrates an example of (D,S,L)={(0,0,28), (5,0,28)} to illustrate the concept. In the first triplet, D=0 may indicate that the transmission occasion begins 0 slots from the reference slot, S=0 indicates a first symbol of the slot as the starting symbol, and L=28 indicates a length of 28 symbols. In the second triplet, D=5 may indicate that the transmission occasion begins 5 slots from the reference slot, S=0 indicates a first symbol of the slot as the starting symbol, and L=28 indicates a length of 28 symbols. Thus, the first triplet indicates a first set of contiguous resources, and the second triplet indicates a second set of contiguous resources, the first and second set of contiguous resources being non-contiguous with each other. L may be the same in both triplets, as in this example. In other aspects, the sets of contiguous resources that form the non-contiguous resources of the transmission occasion may have different lengths.

A single transport block (TB) of the PUSCH may be transmitted in a transmission occasion. If repetitions are allowed, the TB may be transmitted over multiple transmission occasions. Thus, multiple slot PUSCH repetitions may occur over a set of transmission occasions, with each repetition of the TB being transmitted within a single transmission occasion. FIG. 5A illustrates an example of four repetitions of the PUSCH TB in four transmission occasions of contiguous resources according to option (a) and an example of two repetitions of the PUSCH TB in two transmission occasions including non-contiguous sets of resources according to option (b). In some aspects, a repetition factor may be indicated by the base station to the UE, e.g., along with the TDRA for the multiple slot PUSCH transmission. The repetition factor may indicate an amount repetition to the UE. In some aspects, along with the TDRA, the base station may indicate to the UE a periodicity or an offset parameter that may indicate to the UE a spacing for the repetitions. For example, the base station may indicate an inter-repetition gap in symbols or slots. FIG. 5A illustrates an example gap 502 between repetitions for option (a). The gap may indicate a separation in time between the end of one transmission occasion and the beginning of a next transmission occasion or may indicate a separation in time between a beginning of one transmission occasion and a beginning of a next transmission occasion, for example.

FIGS. 5A and 5B illustrate different examples of redundancy version (RV) cycling over repetitions of a TB transmitted as a multiple slot PUSCH transmission. The examples in FIGS. 5A and 5B may correspond to the same source payload for the TB and show that the same source payload may be encoded differently across the resources of a transmission occasion. In the diagram 500 in FIG. 5A, the RV is refreshed, e.g., changed, between transmission occasions, e.g., at gap 502. In FIG. 5A, RV0 is applied to the contiguous resources of a first transmission occasion. The RV index is changed to RV2 at the subsequent transmission occasion. The RV index is then changed to RV3 and RV1 for the following transmission occasions. Similarly, for the transmission occasions of non-contiguous resource sets in option (b), the RV index is similarly maintained across the non-contiguous resource sets of a single transmission occasion and is changed, or refreshed, for a following transmission occasion. The examples are shown for a transmission of a TB over a single transmission occasion. Thus, the RV cycles over repetitions of the TB in different transmission occasions.

FIG. 5B illustrates a diagram 550 in which the RV may be cycled within individual transmission occasions rather than between transmission occasions, as in FIG. 5A. As shown for option (b) in FIG. 5B, a single RV index may be used over a set of contiguous symbols of a non-contiguous transmission occasion and may be changed to a different RV index at a subsequent set of contiguous symbols within the same transmission occasion. Thus, the RV may refresh, or change, at the gap between contiguous resources of a single transmission occasion. As shown for option (a) in FIG. 5B, a single RV index may be used over symbols of a single slot, and a different RV index may be applied to the symbols of a subsequent slot of the transmission occasion. Thus, the RV may refresh, or change, at a slot boundary of a single transmission occasion.

Aspects presented herein may be applied for a multiple slot PUSCH transmission with a single codebook. In some examples, the aspects presented herein may be applied for a multi-codebook PUSCH transmission. However, the multi-codebook PUSCH transmission may provide less gain compared to the single codebook implementation. In some aspects, a TB size may range from approximately 100 bits to 1000 bits, although aspects may similarly be applied to TB sizes that are smaller than or larger than the range.

When a UE transmits a PUSCH spanning multiple slots, the UE may know/store a state of transmission across slots. In some aspects, the state may refer to a state of a last transmitted bit. If the UE interleaves the PUSCH transmission, it may be challenging for the UE to transmit a PUSCH across slots or across non-contiguous symbols. For example, the UE may use information about how much of the interleaved sequence was transmitted and/or may store the untransmitted sequence. In order to simplify the operations of the UE, the UE may apply interleaving within a slot, for example.

Figure 6:
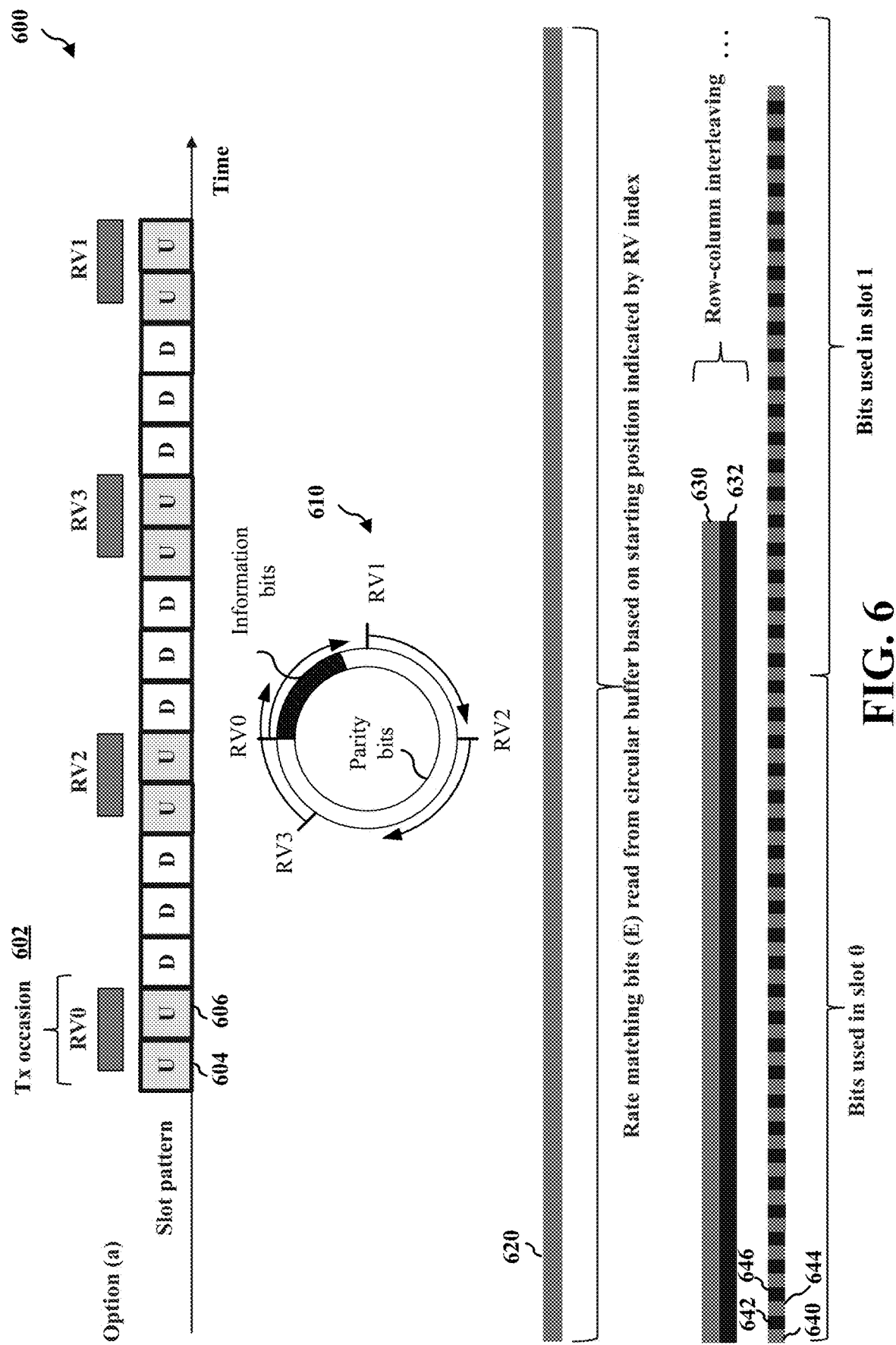
FIG. 6 illustrates example aspects of transmission occasion based interleaving for a multiple slot PUSCH transmission, in accordance with various aspects of the present disclosure.
Figure 7:
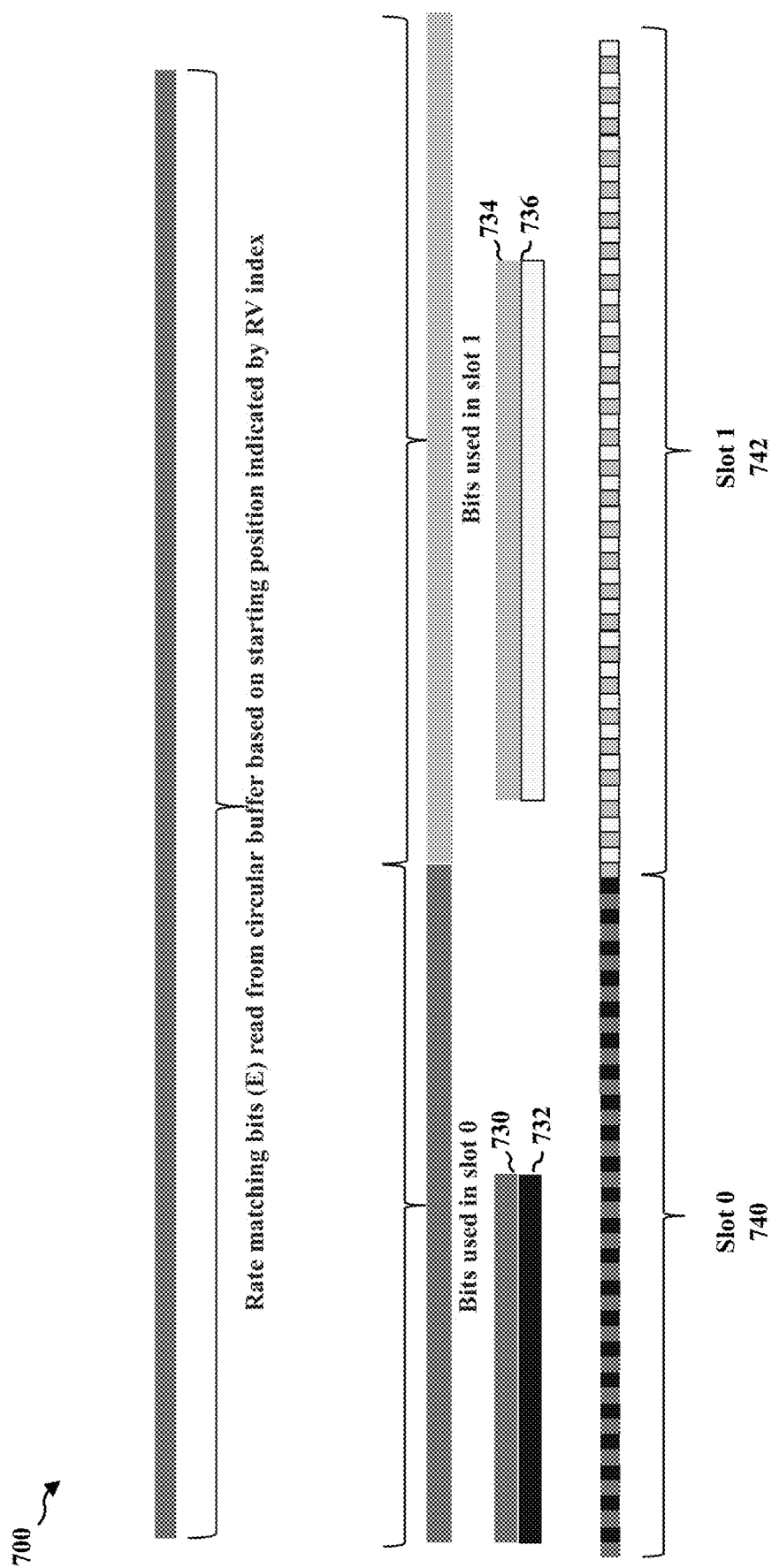
FIG. 7 illustrates example aspects of slot based interleaving for a multiple slot PUSCH transmission, in accordance with various aspects of the present disclosure.

FIG. 6 illustrates a diagram 600 showing example aspects of interleaving a TB for transmission of a multiple slot PUSCH. FIG. 6 shows a pattern of transmission occasions of contiguous resources, e.g., similar to option (a) in FIG. 4. The TB may be transmitted within a single transmission occasion, such as in slot 0, e.g., 604, and slot 1, e.g., 606, of the transmission occasion 602. The UE may read the information bits of the TB from a circular buffer based on a starting position indicated by an RV index, e.g., as shown at 610. The information bits of the TB may start at RB0, for example. The rate matching bits that have been read from the circular buffer are illustrated at 620. Rate matching may include a process in which the number of encoded bits that can be transmitted on the available resources for a PUSCH transmission is determined. For example, a total number of bits may equal the total number of available REs multiplied by a modulation order. Then, the determined number of encoded bits may be read from the circular buffer. "Rate matching bits" as used herein refers to encoded bits selected for transmission based on rate matching requirements and/or principles. The amount of bits may be selected based on the amount of bits for rate matching the TB within the transmission occasion 602, in some aspects. After reading out the bits, the UE may apply interleaving to the bits. For example, channel coding processing for the PUSCH transmission may include a bit-level interleaver for each CB of the TB. FIG. 6 illustrates an example of row-column interleaving in which the bits may be organized, e.g., read into or placed into, multiple columns. FIG. 6 illustrates a first row 630 and a second row 632. The bits are then read from the two rows (e.g., 630, 632) based on column. Thus, a bit from a first column of row 630 corresponds to bit 640 for transmission in slot 0. A bit from the first column of row 632 corresponds to bit 642 for transmission in slot 0. The process continues to the bit in the second column of row 630 being placed at 644 followed by the bit in the second column of row 632 being placed at 646, and so forth. The bits for rate matching across an entire transmission occasion may be interleaved and transmitted, as shown in FIG. 6, which shows the interleaving applied across slot 0 and slot 1 of the transmission occasion 602. In other aspects, the bits for rate matching may be selected per slot and may be interleaved per slot before transmission, such as illustrated in FIG. 7. FIG. 7 illustrates a diagram 700 showing that the bits for slot 0 may be read into row 730 and row 732, whereas the bits for slot 1 may be read into row 734 and 736. Then, the bits for slot 0 are read in a column manner from the rows 730 and 732 to form a slot-based interleaved pattern 740 for slot 0, and the bits for slot 1 are read in a column manner from rows 734 and 736 to form a slot-based interleaved pattern 742 for slot 1.

Figure 8:
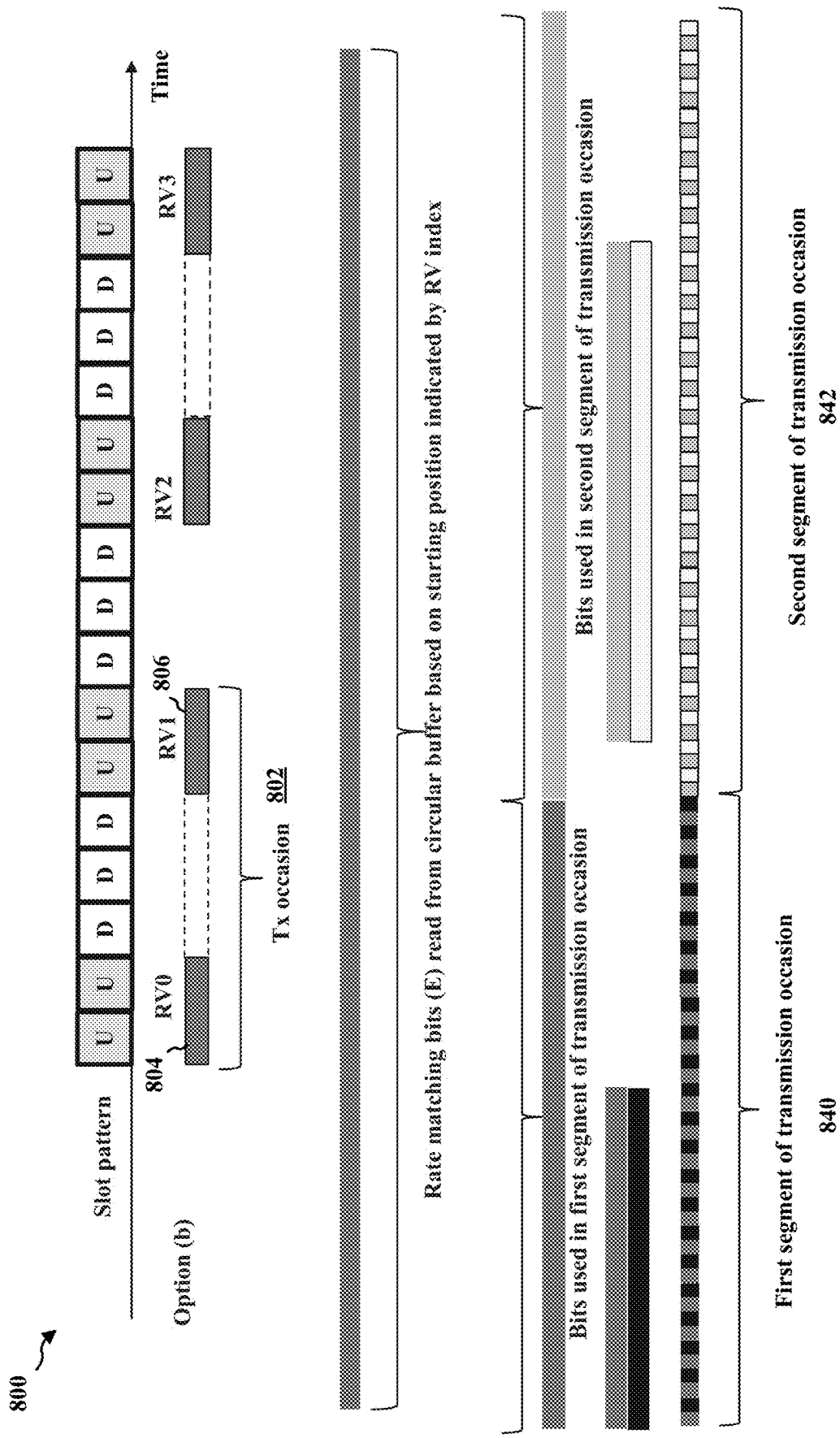
FIG. 8 illustrates example aspects of segment based interleaving for a multiple slot PUSCH transmission in a transmission occasion having non-contiguous segments of resources, in accordance with various aspects of the present disclosure.

FIGS. 6, 7, and 8 are based on an entire TB being encoded in a single code block (CB). A TB may be encoded across multiple CBs. When an entire TB is encoded using a single CB, the encoded bits (in the circular buffer) for the transmission can be chosen on a per-slot basis or a per-TO basis. These chosen bits are called rate-matched bits. The interleaver operates on the rate-matched bits. When the rate-matched bits are chosen at once for the entire TO, the interleaver spans across the entire TO. When the rate-matched bits are chosen per slot, the interleaver spans a single slot. When the rate-matched bits are chosen on a per slot basis, multiple sets of rate-matched bits will be selected and individually interleaved so that the resources across the entire TO are used.

The example in FIG. 6 may be applied for transmission occasion based rate matching and interleaving for non-contiguous resources of a single transmission occasion, such as in option (b) of FIG. 4. Rather than the bits being for slot 0 and slot 1, as in FIG. 6, the bits may be for non-contiguous slots that are comprised in the same transmission occasion. FIG. 8 illustrates a diagram 800 of an example of segment based rate matching and interleaving for non-contiguous resources of a single transmission occasion, such as in option (b) shown in FIG. 8. FIG. 8 illustrates the transmission occasion 802 including a first segment 804 of contiguous resources and a second segment 806 of contiguous resources. Rather than being rate matched and interleaved per slot, as in FIG. 7, the bits may be read out for rate matching and interleaving, such as row-column interleaving, to obtain the interleaved bits 840 of the first segment of contiguous resources (e.g., 804) and the interleaved bits 842 of the second segment of contiguous resources (e.g., 806).

Thus, in a first option, the rate matching and interleaving may be applied to bits across an entire transmission occasion, as illustrated in FIG. 6, which may be referred to as transmission occasion based rate matching and interleaving or may be referred to as rate matching and interleaving across a transmission occasion. Thus, the bits may be selected, read, or otherwise input, for a transmission occasion. The bits for the transmission occasion may then be rate matched and interleaved and transmitted by the UE. In a second option, the bits may be selected per slot, and the interleaving may be applied to the bits for the slot, as shown in FIG. 7, which may be referred to as slot based interleaving, interleaving per slot, or interleaving across a slot. Thus, the bits may be selected, read, or otherwise input for a slot. The bits for the slot may then be interleaved and transmitted by the UE. In a third option, the bits may be selected per segment of a transmission occasion with non-contiguous segments, and the interleaving may be applied to the bits for a respective segment, as shown in FIG. 8, which may be referred to as segment based interleaving, interleaving per segment, or interleaving across a segment. Thus, the bits may be selected, read, or otherwise input for a segment. The bits for the segment may then be interleaved and transmitted by the UE.

If the UE rate matches and interleaves the bits per slot, as in FIG. 7, the UE may use a starting position within the circular buffer for each slot. The UE may not need to buffer the interleaved bits, and may instead preserve the circular buffer. The per slot rate matching and interleaving may provide an improved timeline, resource management, and/or memory management for the UE. In some aspects, UCI may be multiplexed with PUSCH. UCI multiplexing may be considered on a per slot basis, e.g., based on an overlap between the slot in which the UCI is to be transmitted and the slot in which the PUSCH is to be transmitted. In some aspects, the timeline may be tied to a different reference point than the beginning of the multiple slot PUSCH transmission.

For rate matching and interleaving bits per segment, as illustrated in the example in FIG. 8, the UE may remember a starting position within the circular buffer for each segment, e.g., without buffering interleaved bits, similar to the slot based interleaving.

If the UE rate matches and interleaves bits across a transmission occasion, e.g., as in FIG. 6, performance may be improved because system bits may occupy more reliable positions within the transmission occasion.

UCI multiplexing per slot may be easier when rate matching and interleaving per slot in comparison to rate matching and interleaving bits across a transmission occasion or a segment of a transmission occasion.

In some aspects, a UE may have UCI for transmission at a time that overlaps with a multiple slot PUSCH transmission. The UE may multiplex the UCI with the PUSCH transmission. The UCI may be scheduled within a slot, and the PUSCH may extend across multiple slots. Aspects presented herein enable the UE to determine how many resources allocated for the PUSCH to use for the UCI, the location for the UCI within the PUSCH, encoding and rate matching for the PUSCH with the multiplexed UCI, etc.

Figure 9:
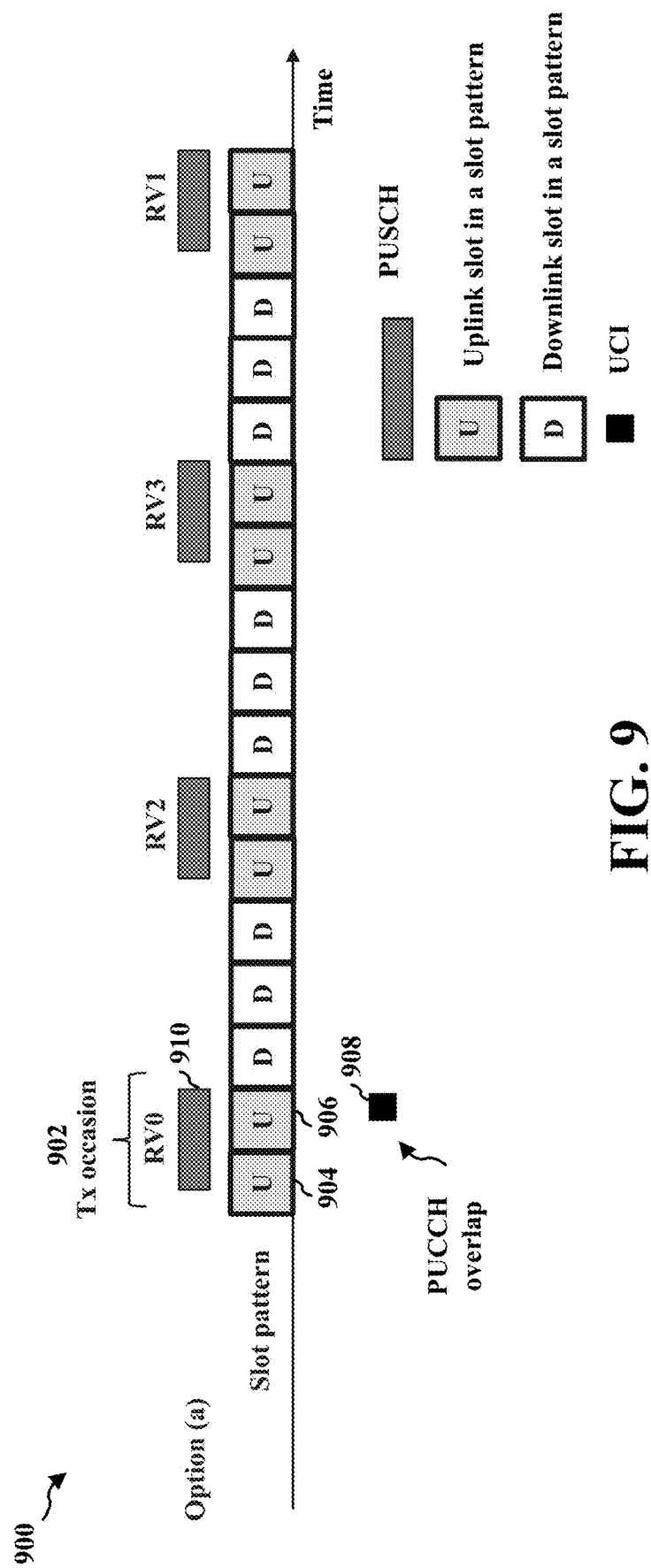
FIG. 9 illustrates an example of UCI overlapping in time with a transmission occasion for a multiple slot PUSCH transmission, the transmission occasion having contiguous resources, in accordance with various aspects of the present disclosure.

FIG. 9 illustrates an example 900 of a transmission occasion 902 having contiguous resources (e.g., resources in slot 904 and slot 906), similar to option (a) in FIG. 4. FIG. 9 also illustrates a PUCCH overlap of UCI 908 with slot 906 of the PUSCH 910. As presented herein, an overlap between the PUSCH and the PUCCH may be handled independently per transmission occasion of the PUSCH. The UCI may include various types of information. In some aspects, the UCI may include ACK/NACK information, e.g., HARQ feedback, for a PDSCH received from the base station. In other aspects, the UE may receive and measure CSI-RS from the base station, and may have a CSI report to transmit as UCI to the base station.

For each transmission occasion in which one of the multiple slots of the contiguous resources of the transmission occasion are overlapped in time with PUCCH resources for the transmission of UCI, the UE may consider whether to multiplex the PUCCH, e.g., the UCI, in the resources of the transmission occasion.

The UE may consider whether to multiplex the UCI of the PUCCH within the slot of the overlap, e.g., and not within other slots of the transmission occasion. In some aspects, the timeline for multiplexing the UCI may be based on the slot of the overlap, e.g., slot 906 in FIG. 9. In other aspects, the timeline for multiplexing the UCI may be based on the start of the transmission occasion 902.

The UE may consider whether to multiplex the UCI of the PUCCH over the transmission occasion, e.g., rather than limited to a slot of overlap with the UCI. The timeline for multiplexing the UCI may be based on the start of the transmission occasion 902.

Table 1 illustrates an example of various scenarios (e.g. examples 1-5) that show various combinations of considerations for multiplexing UCI with a contiguous resource transmission occasion (e.g., option (a) of FIG. 4) of a multiple slot PUSCH transmission.

TABLE 1

|  | Overlapping Slot | Multiplexing slot/TO | PUSCH Handling | Timeline |
|---|---|---|---|---|
| Ex. 1 | Slot 0 | Slot 0 | Per-slot rate matching and interleaving Or Per-slot RV cycling Or Per-TO rate matching and interleaving Or Per-TO RV cycling | Slot0-based |
| Ex. 2 | Slot 0 | Entire TO | Per-slot rate matching and interleaving Or Per-slot RV cycling Or Per-TO rate matching and interleaving Or Per-TO RV cycling | Slot0-based |
| Ex. 3 | Slot 1 | Slot 1 | Per-slot rate matching and interleaving Or Per-slot RV cycling | Slot1-based |
|  | Slot 1 | Slot 1 | Per-TO rate matching and interleaving Or Per-TO RV cycling | Slot0-based |
| Ex. 4 | Slot 1 | Entire TO | Per-slot rate matching and interleaving Or Per-slot RV cycling Or Per-TO rate matching and interleaving Or Per-TO RV cycling | Slot0-based |
| Ex. 5 | Slot X | Repeat in each slot | Per-slot rate matching and interleaving Or Per-slot RV cycling Or Per-TO rate matching and interleaving Or Per-TO RV cycling | Slot0-based |

Figure 10:
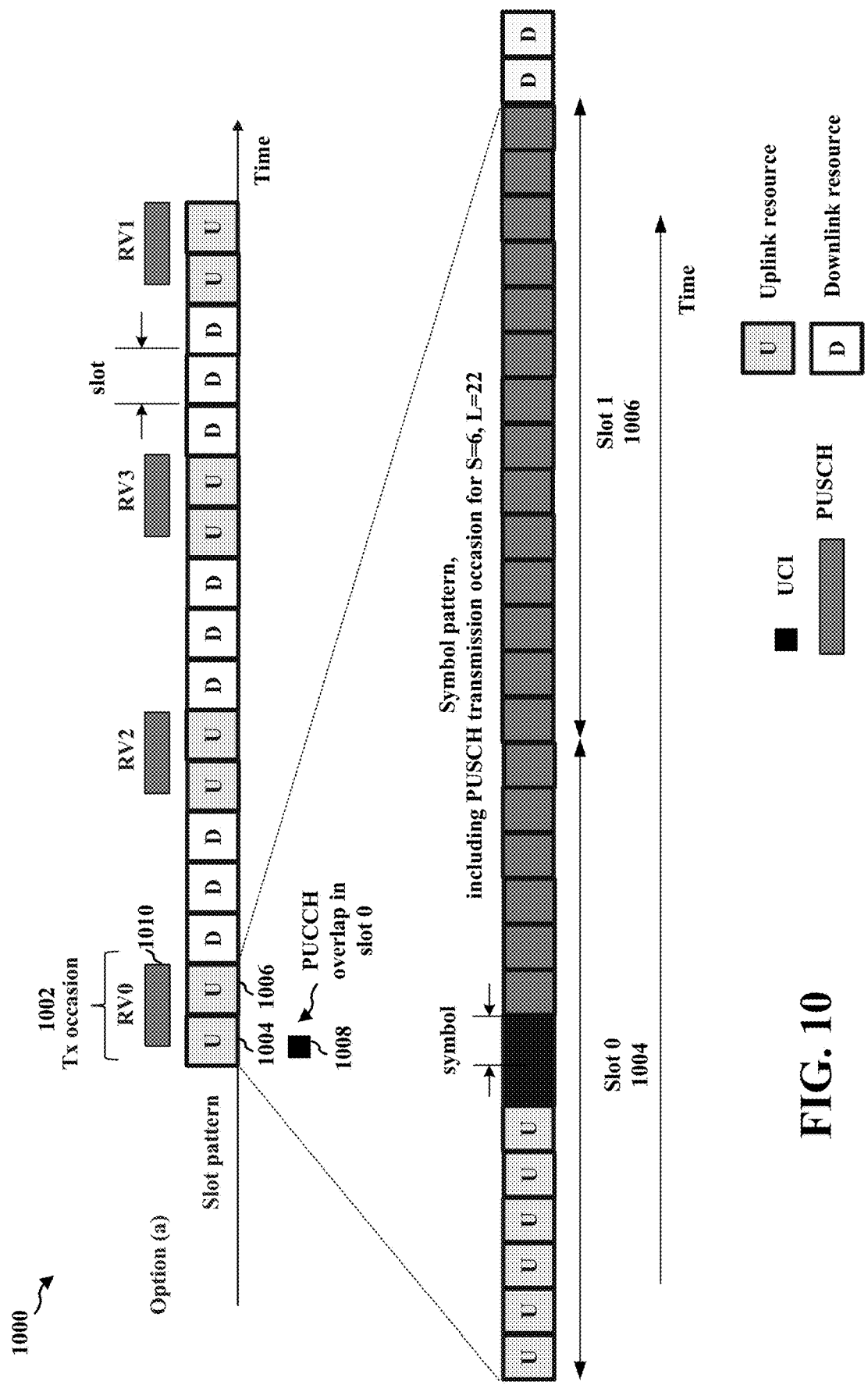
FIG. 10 illustrates an example of multiplexing UCI in an overlapped slot of a transmission occasion for a multiple slot PUSCH transmission, the transmission occasion having contiguous resources, in accordance with various aspects of the present disclosure.

FIG. 10 illustrates an example diagram 1000 of example 1 from Table 1, in which the UCI 1008 overlaps in slot 0 (e.g., slot 1004) of transmission occasion 1002 having contiguous resources in slots 1004 and 1006. The UCI overlaps in slot 0 and is multiplexed in slot 0 of the transmission occasion 1002. FIG. 10 illustrates that the resources of the UCI may be comprised within a single slot, e.g., slot 0 1004. Slot 0 may also include other transmissions in symbols of the slot. For example, the UCI may be transmitted following transmission of DMRS.

In the example in FIG. 10, the UE may determine the resources for the UCI transmission based on the resources available in slot 0 1004. The UE may apply a beta factor on top of resources available for PUSCH transmission in slot 0 1004. For a single slot PUSCH, the UE may determine a number of REs that are potentially available for the UCI transmission across the PUSCH symbols in which the UCI may be multiplexed, divided by the number of REs by the total number of PUSCH bits.

In contrast, for a multiple slot PUSCH transmission based on the example in FIG. 10, the UE may instead determine the number of REs that are potentially available for the UCI across the PUSCH symbols in the particular slot (e.g., slot 0 1004) of a transmission occasion divided by the total number of PUSCH bits after scaling with a factor based on a number of symbols in slot 0 divided by a total number of PUSCH symbols in the transmission occasion.

As an example, for UCI that includes HARQ-ACK bits on a single slot PUSCH, the UE may determine the number of coded modulation symbols per layer for HARQ-ACK transmission, denoted as $Q'_{ACK}$, as follows:

Equation 1

$$Q'_{ACK} = \min\left\{ \left\lceil \frac{(O_{ACK} + L_{ACK}) \cdot \beta_{offset}^{PUSCH} \cdot \sum_{l=0}^{N_{symball}^{PUSCH}-1} M_{sc}^{UCI}(l)}{\sum_{r=0}^{C_{UL-SCH}-1} K_r} \right\rceil, \left\lceil \alpha \cdot \sum_{l=l_0}^{N_{symball}^{PUSCH}-1} M_{sc}^{UCI}(l) \right\rceil \right\}$$

In this example of equation 1, $O_{ACK}$ is the number of HARQ-ACK bits, and $L_{ACK}$ is the number of CRC bits for HARQ-ACK. $M_{sc}^{PUSCH}$ is the scheduled bandwidth of the PUSCH transmission, expressed as a number of subcarriers. $M_{sc}^{UCI}(l)$ is the number of resource elements that can be used for transmission of UCI in OFDM symbol l, for l=0, 1, 2, ..., $N_{symball}^{PUSCH}-1$, in the PUSCH transmission and $N_{symball}^{PUSCH}$ the total number of OFDM symbols of the PUSCH, including all OFDM symbols used for DMRS $M_{sc}^{PT-RS}(l)$ is the number of subcarriers in OFDM symbol l that carries PTRS, in the PUSCH transmission. $\alpha$ is configured by higher layer parameter, e.g., a scaling parameter. In this example, $l_0$ is the symbol index of the first OFDM symbol that does not carry DMRS of the PUSCH, after the first DMRS symbol(s), in the PUSCH transmission. $\beta_{offset}^{PUSCH}$ is a beta offset.

Thus, in this single slot PUSCH example, $$\sum_{r=0}^{C_{UL-SCH}-1} K_r$$

in equation 1 may correspond to a total number of PUSCH bits, and $$\sum_{l=0}^{N_{symball}^{PUSCH}-1} M_{sc}^{UCI}(l)$$

in equation 1 may correspond to a number of REs potentially available for UCI across all of the PUSCH symbols.

In contrast, for the multiple slot PUSCH transmission occasion of FIG. 10, $$\sum_{l=0}^{N_{symball}^{PUSCH}-1} M_{sc}^{UCI}(l)$$

in equation 1 may correspond to a number of REs potentially available for the UCI 1008 across the PUSCH symbols in slot 0 1004, and $$\sum_{r=0}^{C_{UL-SCH}-1} K_r$$

in equation 1 may correspond to a total number of PUSCH bits scaled by a number of symbols in slot 0 divided by the total number of PUSCH symbols in the transmission occasion 1002, e.g., including both slot 0 1004 and slot 1 1006. Such a determination better takes into account the overall burden placed on the PUSCH transmission when multiplexing the UCI 1008 into slot 0.

After determining the number of resources to use for the UCI 1008 in slot 0 in FIG. 10, the UE may identify a location of the resources within slot 0 1004. The UE may then fill the identified resources in slot 0 1004 with the UCI symbols. The UE may fill the frequency resources of a particular symbol first, and then in additional symbols, e.g., if all of the frequency resources of a symbol are filled with the UCI. Such a filling of resources may be referred to a frequency first, time second manner. The UE may determine PUSCH rate matching bits using the remaining resources in slot 0 1004 and slot 1 1006, e.g., based on the remaining resources of the transmission occasion. The UE may interleave the rate matched bits of the PUSCH 1110. As shown in table 1, the rate matching and interleaving and/or the RV cycling for example 1 may be either per slot (e.g., as described in connection with FIG. 7) or per transmission occasion (e.g., as described in connection with FIG. 6). After interleaving, the UE may fill the resources of the transmission occasion 1002 identified for the PUSCH 1010 with the interleaved bits mapped to modulation symbols.

Figure 11:
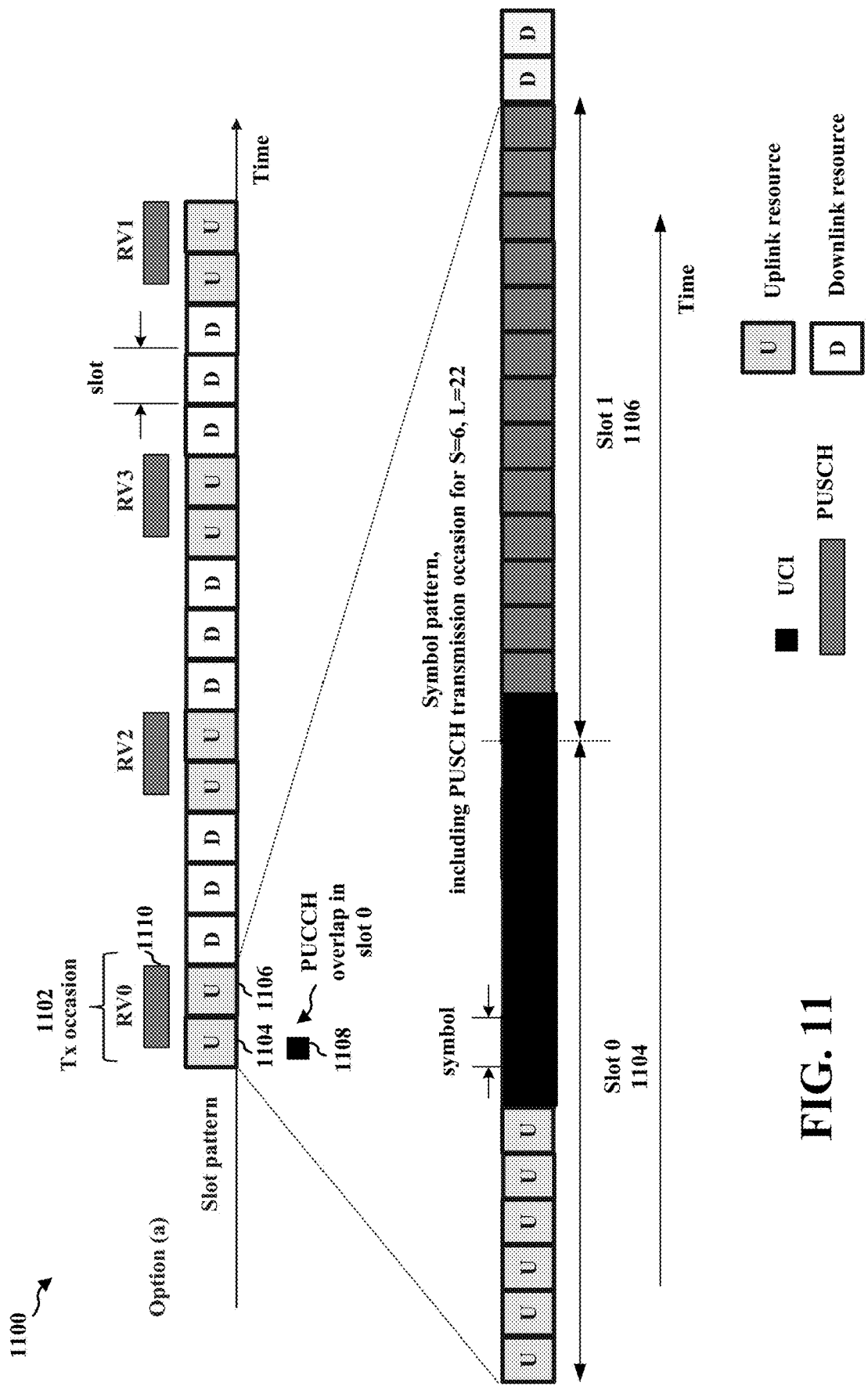
FIG. 11 illustrates an example of multiplexing UCI across a transmission occasion for a multiple slot PUSCH transmission, the transmission occasion having contiguous resources, in accordance with various aspects of the present disclosure.

FIG. 11 is a diagram 1100 showing PUCCH (e.g., UCI 1108) that overlaps with PUSCH 1110 in slot 0 1104 of a transmission occasion 1102, and is multiplexed based on the transmission occasion 1102 rather than just the slot of overlap. FIG. 11 corresponds to example 2 in Table 1 in which the overlapping slot is slot 0 and the multiplexing is based on the transmission occasion. As illustrated in FIG. 11, the resources for multiplexing the UCI 1108 may span multiple slots.

In the example in FIG. 11, the UE may determine the resources for the UCI based on resources available in the transmission occasion 1102. For example, in the multiple slot PUSCH transmission occasion 1102 of FIG. 11, $$\sum_{l=0}^{N_{symball-1}^{PUSCH}} M_{sc}^{UCI}(l)$$

in equation 1 may correspond to a number of REs potentially available for the UCI 1108 across the PUSCH symbols of the transmission occasion 1102 (including slot 0 1104 and slot 1 1106), and $$\sum_{r=0}^{C_{UL-SCH}-1} K_r$$

in equation 1 may correspond to a total number of PUSCH bits of the multiple slots of the transmission occasion 1102.

After determining the number of resources to use for the UCI 1108 in the transmission occasion 1102, the UE may identify a location of the resources within the transmission occasion 1102. The UE may then fill the identified resources in the transmission occasion 1102 with the UCI symbols. The UE may fill the resources in a frequency first, time second manner. The UE may determine PUSCH rate matching bits using the remaining resources in the transmission occasion 1102 (e.g., in slot 0 1104 and slot 1 1106). The UE may interleave the rate matched bits of the PUSCH. As illustrated in Table 1, at example 2, the rate matching and interleaving and/or the RV cycling may be per slot (e.g., as described in connection with FIG. 7) or per transmission occasion (e.g., as described in connection with FIG. 6). After interleaving, the UE may fill the resources of the transmission occasion 1102 identified for the PUSCH 1110 with the interleaved bits mapped to modulation symbols.

Figure 12:
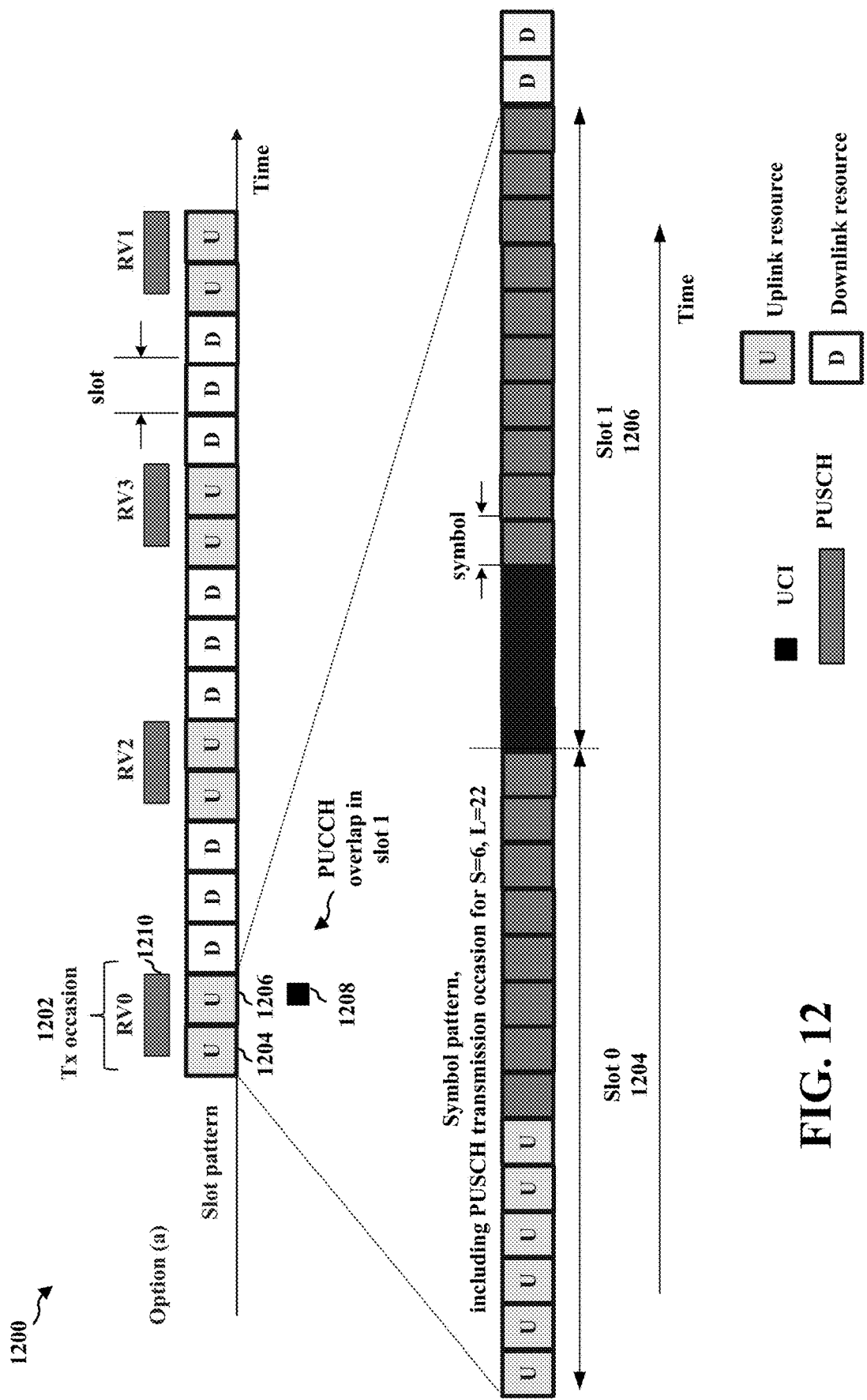
FIG. 12 illustrates an example of multiplexing UCI in an overlapped slot of a transmission occasion for a multiple slot PUSCH transmission, the transmission occasion having contiguous resources, in accordance with various aspects of the present disclosure.

FIG. 12 illustrates a diagram 1200 showing PUCCH (e.g., UCI 1208) that overlaps with slot 1 1206 of a transmission occasion 1202 for PUSCH 1210 rather than a first slot 1204 of the transmission occasion 1202, as in FIGS. 10 and 11. FIG. 12 corresponds to example 3 in Table 1, in which the overlapping slot is slot 1 and is multiplexed in slot 1. FIG. 12 illustrates an example in which the UCI 1208 is multiplexed within a single slot (e.g., slot 1 1206).

The UE may determine the number of resources to use for the UCI 1208 in slot 1 1206. Similar to the explanation in connection with FIG. 10, the UE may determine the number of resources based on the number of REs potentially available for the UCI in the PUSCH symbols of slot 1 1206 and based on the total number of PUSCH bits scaled by the number of symbols in slot 1 and the total number of PUSCH symbols in the transmission occasion.

For example, $$\sum_{l=0}^{N_{symball-1}^{PUSCH}} M_{sc}^{UCI}(l)$$

in equation 1 may correspond to a number of REs potentially available for the UCI 1208 across the PUSCH symbols in slot 1 1206, and $$\sum_{r=0}^{C_{UL-SCH}-1} K_r$$

in equation 1 may correspond to a total number of PUSCH bits scaled by a number of symbols in slot 1 1206 divided by the total number of PUSCH symbols in the transmission occasion 1202, e.g., including both slot 0 1204 and slot 1 1206.

After determining the number of resources to use for the UCI 1208 in slot 1 in FIG. 12, the UE may identify a location of the UCI resources within slot 1 1204. The UE may then fill the identified resources in slot 1 1204 with the UCI symbols. The UE may fill the resources in a frequency first, time second manner. The UE may determine PUSCH rate matching bits using the remaining resources in slot 1 1206. The UE may determine the rate matched bits of for slot 1 based on where the slot 0 transmission ended. The UE may then interleave the rate matched bits. As shown in table 1, the rate matching and interleaving and/or the RV cycling for example 3 may be either per slot (e.g., as described in connection with FIG. 7) or per transmission occasion (e.g., as described in connection with FIG. 6). After interleaving, the UE may fill the resources identified for the PUSCH 1210 with the interleaved bits mapped to modulation symbols.

Figure 13:
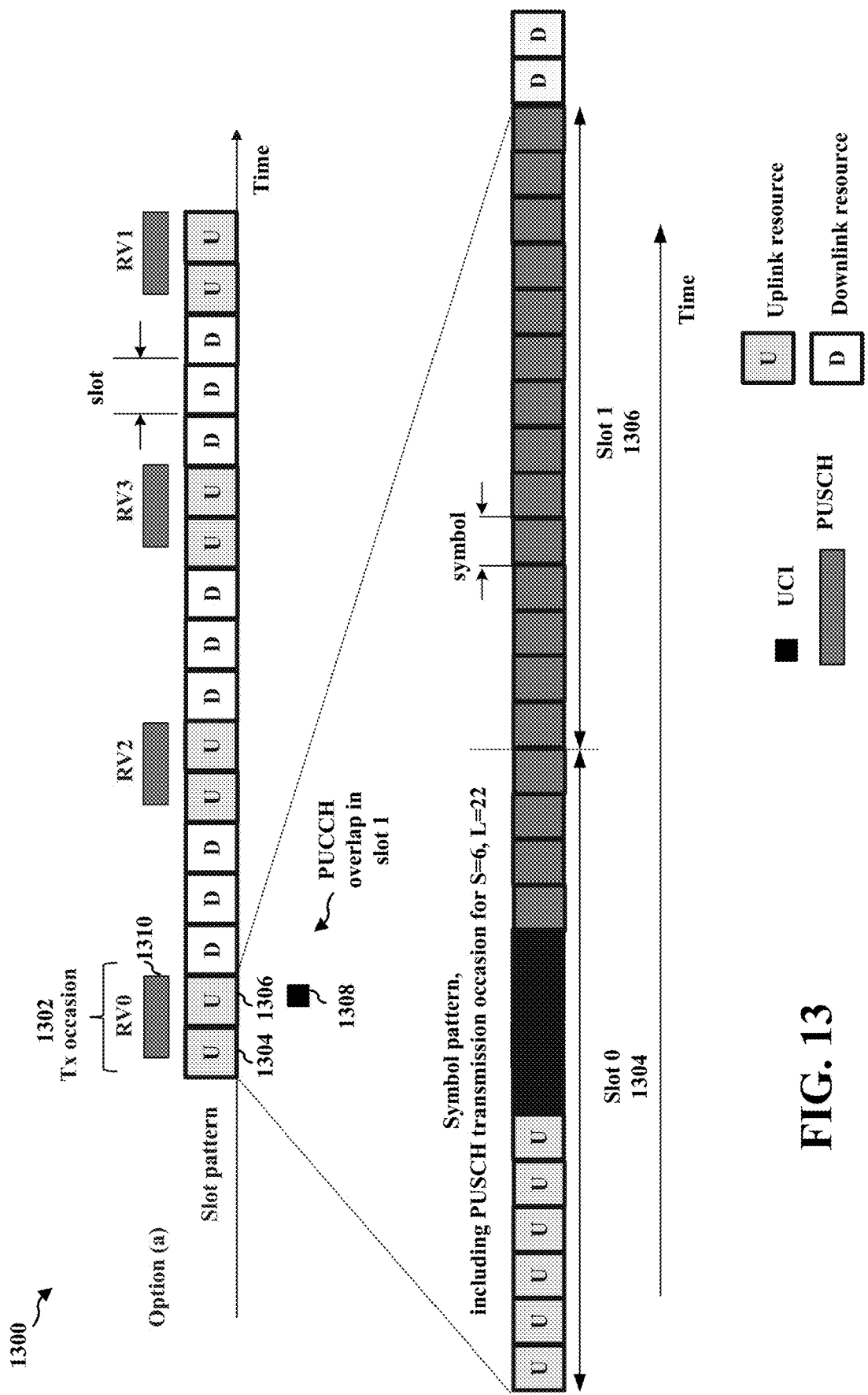
FIG. 13 illustrates an example of multiplexing UCI over a transmission occasion for a multiple slot PUSCH transmission, the transmission occasion having contiguous resources, in accordance with various aspects of the present disclosure.

FIG. 13 illustrates a diagram 1300 showing PUCCH (e.g., UCI 1308) that overlaps with slot 1 1306 of a transmission occasion 1302 for PUSCH 1310 rather than a first slot 1304 of the transmission occasion 1302, as in FIGS. 10 and 11. In contrast to FIG. 12, in FIG. 13, the UCI is multiplexed based on the transmission occasion rather than the slot of overlap. Thus, in FIG. 12, the UCI is multiplexed in slot 0 1304, and not necessarily in the slot with which the UCI overlaps. In some aspects, the multiplexed UCI may span multiple slots. FIG. 13 may correspond to the example 4 in Table 1.

In the example in FIG. 13, the UE may determine the resources for the UCI 1308 based on resources available in the transmission occasion 1302. For example, in the multiple slot PUSCH transmission occasion 1302 of FIG. 13, $$\sum_{l=0}^{N_{symball-1}^{PUSCH}} M_{sc}^{UCI}(l)$$

in equation 1 may correspond to a number of REs potentially available for the UCI 1308 across the PUSCH symbols of the transmission occasion 1302 (including slot 0 1304 and slot 1 1306), and $$\sum_{r=0}^{C_{UL-SCH}-1} K_r$$

in equation 1 may correspond to a total number of PUSCH bits of the multiple slots of the transmission occasion 1302.

After determining the number of resources to use for the UCI 1308 in the transmission occasion 1302, the UE may identify a location of the resources within the transmission occasion 1302. The UE may then fill the identified resources in the transmission occasion 1302 with the UCI symbols. The UE may fill the resources in a frequency first, time second manner. The UE may determine PUSCH rate matching bits using the remaining resources in the transmission occasion 1302 (e.g., in slot 0 1304 and slot 1 1306). The UE may interleave the rate matched bits of the PUSCH. As illustrated in Table 1, at example 4, the interleaving/RV cycling may be per slot (e.g., as described in connection with FIG. 7) or per transmission occasion (e.g., as described in connection with FIG. 6). After interleaving, the UE may fill the resources of the transmission occasion 1302 identified for the PUSCH 1310 with the interleaved bits mapped to modulation symbols.

Figure 14:
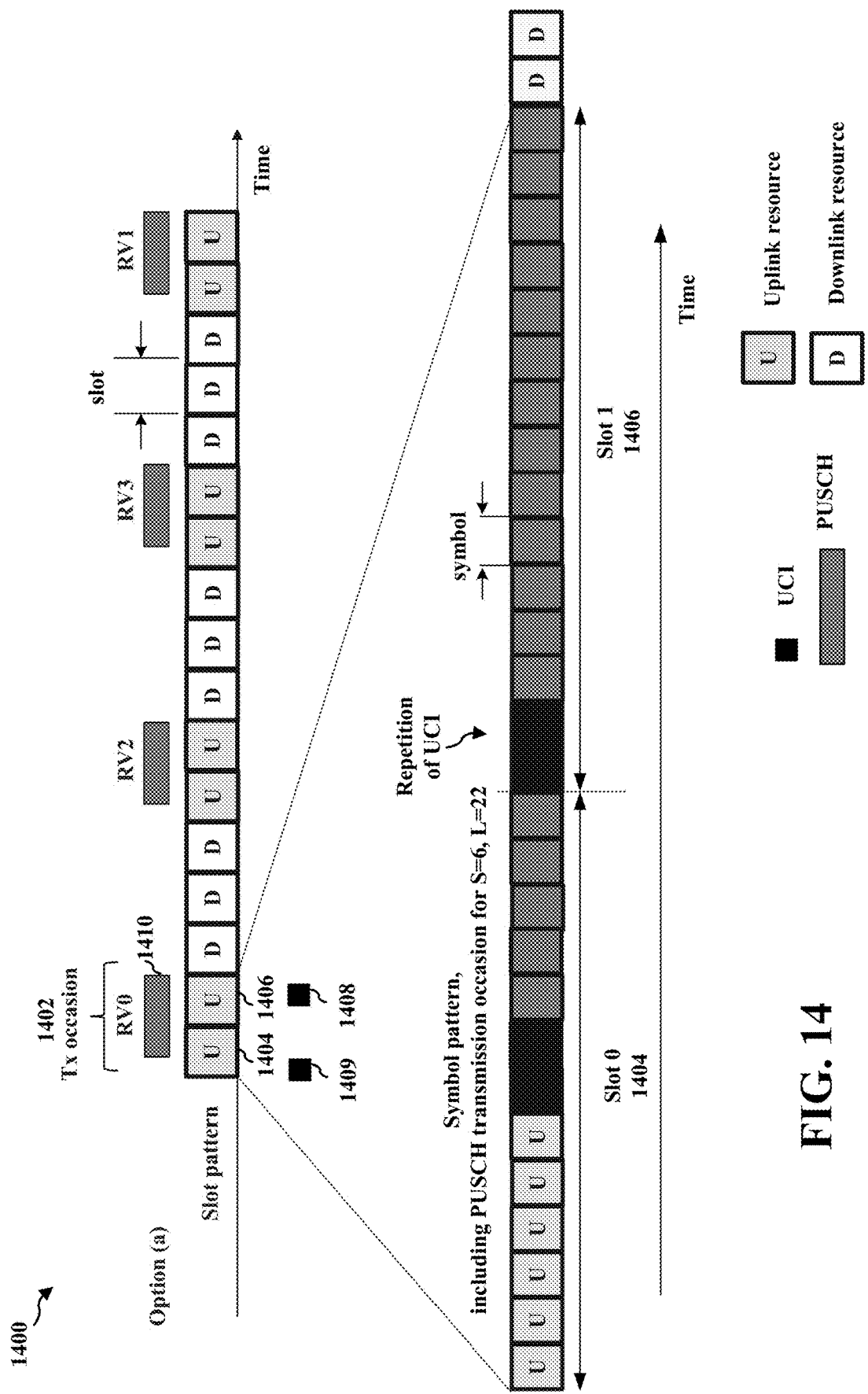
FIG. 14 illustrates an example of multiplexing repetitions of UCI in a transmission occasion for a multiple slot PUSCH transmission, the transmission occasion having contiguous resources, in accordance with various aspects of the present disclosure.

FIG. 14 illustrates a diagram 1400 showing PUCCH (e.g., UCI 1408 and/or 1409) that is multiplexed with multiple slots of the transmission occasion 1402 (e.g., slot 0 1404 and slot 1 1406) for PUSCH 1410. The resources to use for multiplexing the UCI may be comprised in a single slot, and may be repeated in each slot. The UCI may be repeated in each slot of the transmission occasion 1402. The timeline may be based on slot 0 1404 of the transmission occasion 1402. FIG. 14 may correspond to example 5 in Table 1.

Figure 15:
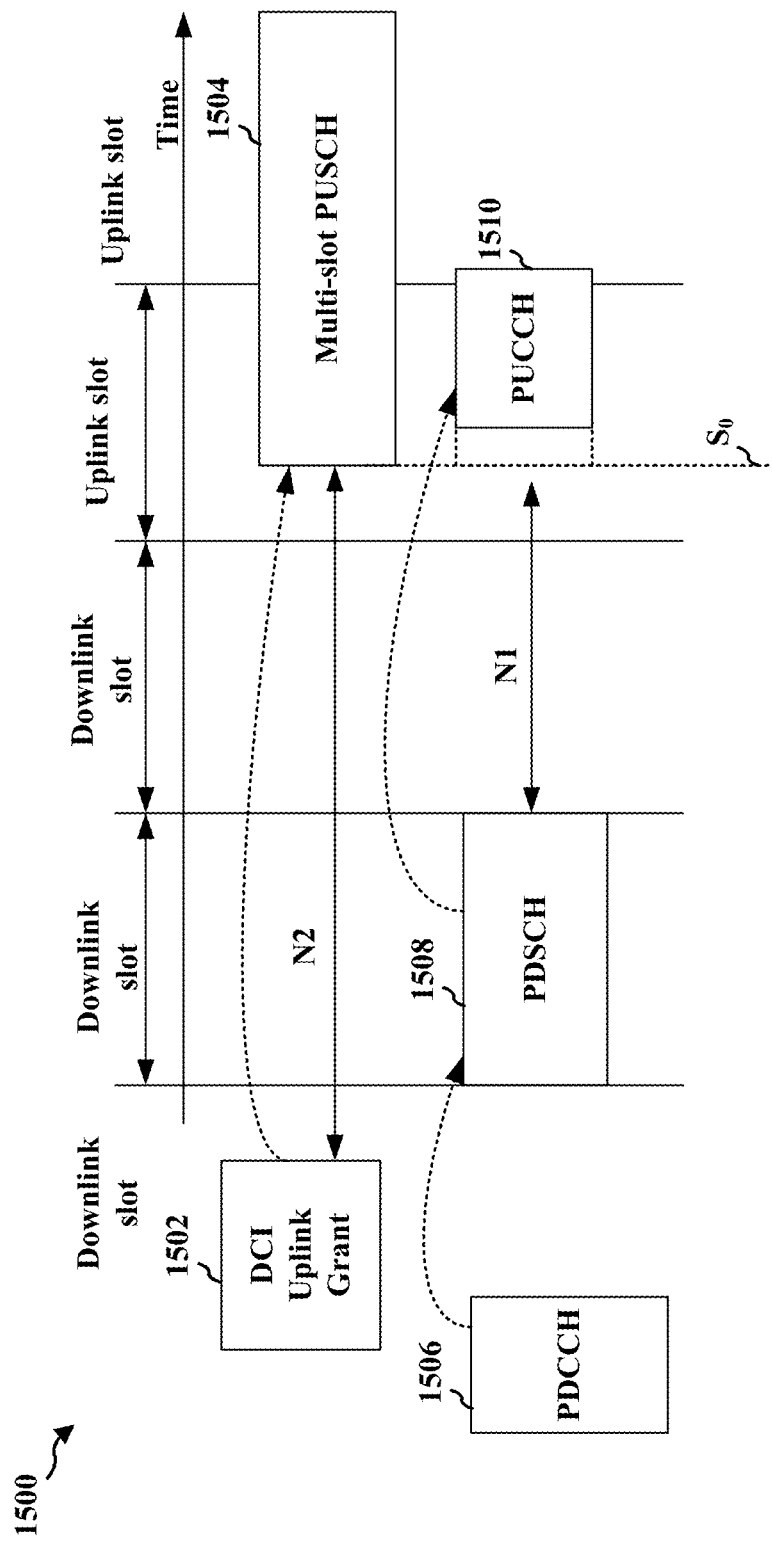
FIG. 15 illustrates example processing timeline considerations for multiplexing UCI with a multiple slot PUSCH transmission, in accordance with various aspects of the present disclosure.

FIG. 15 illustrates a diagram 1500 showing aspects of timeline considerations for multiplexing UCI in a multiple slot PUSCH transmission. As illustrated in FIG. 15, a UE may consider multiplexing UCI for transmission in PUCCH 1510 that overlaps in time with a transmission occasions for a multiple slot PUSCH 1504. The UE may apply processing timelines in determining whether to multiplex the UCI (e.g., from PUCCH 1510) into the PUSCH 1504. In some aspects, the processing timeline may be based on a minimum gap (N2) of symbols between reception of an uplink grant DCI 1502 scheduling uplink resources for the PUSCH 1504 and the start of the multiple slot PUSCH transmission 1504. If the start of the multiple slot PUSCH transmission 1504 is more than N2 symbols after the uplink grant DCI 1502 is received, the UE may transmit the multiple slot PUSCH 1504. If the start of the multiple slot PUSCH transmission 1504 is less than N2 symbols after the uplink grant DCI 1502 is received, the UE may not transmit the multiple slot PUSCH 1504. In some aspects, the processing timeline may be based on a minimum gap (N1) of symbols between reception of PDSCH 1508 and a start of a PUCCH 1510 carrying UCI (e.g., a HARQ ACK/NACK payload about reception of the PDSCH). If the start of the PUCCH 1510 is more than N1 symbols after the PDSCH 1508 is received, the UE may transmit the UCI (e.g., HARQ ACK/NACK) in the PUCCH 1510. If the start of the PUCCH 1510 is less than N1 symbols after the PDSCH 1508 is received, the UE may not transmit the UCI (e.g., HARQ ACK/NACK) in the PUCCH 1510. When the UE is considering multiplexing the UCI from the PUCCH 1510 into the multiple slot PUSCH 1504, a reference time (e.g., $S_0$) may be used to measure whether the processing timelines based on N2 and N1 are met. The reference time may be different based on various aspects of the UCI multiplexing, such as wherein the PUCCH overlap occurs, where the UCI is to be multiplexed, the manner in which the UCI is to be multiplexed, etc. As an additional consideration, the HARQ ACK/NACK bits from the PUCCH 1510 may be multiplexed into the multiple slot PUSCH 1504 if the downlink grant 1506 for the PDSCH 1508 is received prior to the uplink grant 1502 for the multiple slot PUSCH 1504.

In a first example, if the PUCCH 1510 overlap occurs in a first slot of the multiple slot PUSCH transmission 1504 and the UCI is multiplexed on to the first slot, such as in the example in FIG. 10, the reference time $S_0$ may be based on the start of the multiple slot PUSCH transmission 1504, as shown in FIG. 15.

If the PUCCH overlap occurs in the first slot of multi-slot PUSCH transmission and UCI is multiplied across the entire transmission occasion, e.g., as described in connection with FIG. 11, the reference time $S_0$ may be based the start of the multi-slot PUSCH transmission 1504, as shown in FIG. 15.

Thus, the reference time $S_0$ at the start of the multi-slot PUSCH transmission 1504 may be applied for UCI that overlaps a first slot of a transmission occasion, whether the UCI is multiplexed based on the first slot or across the transmission occasion.

Figure 16:
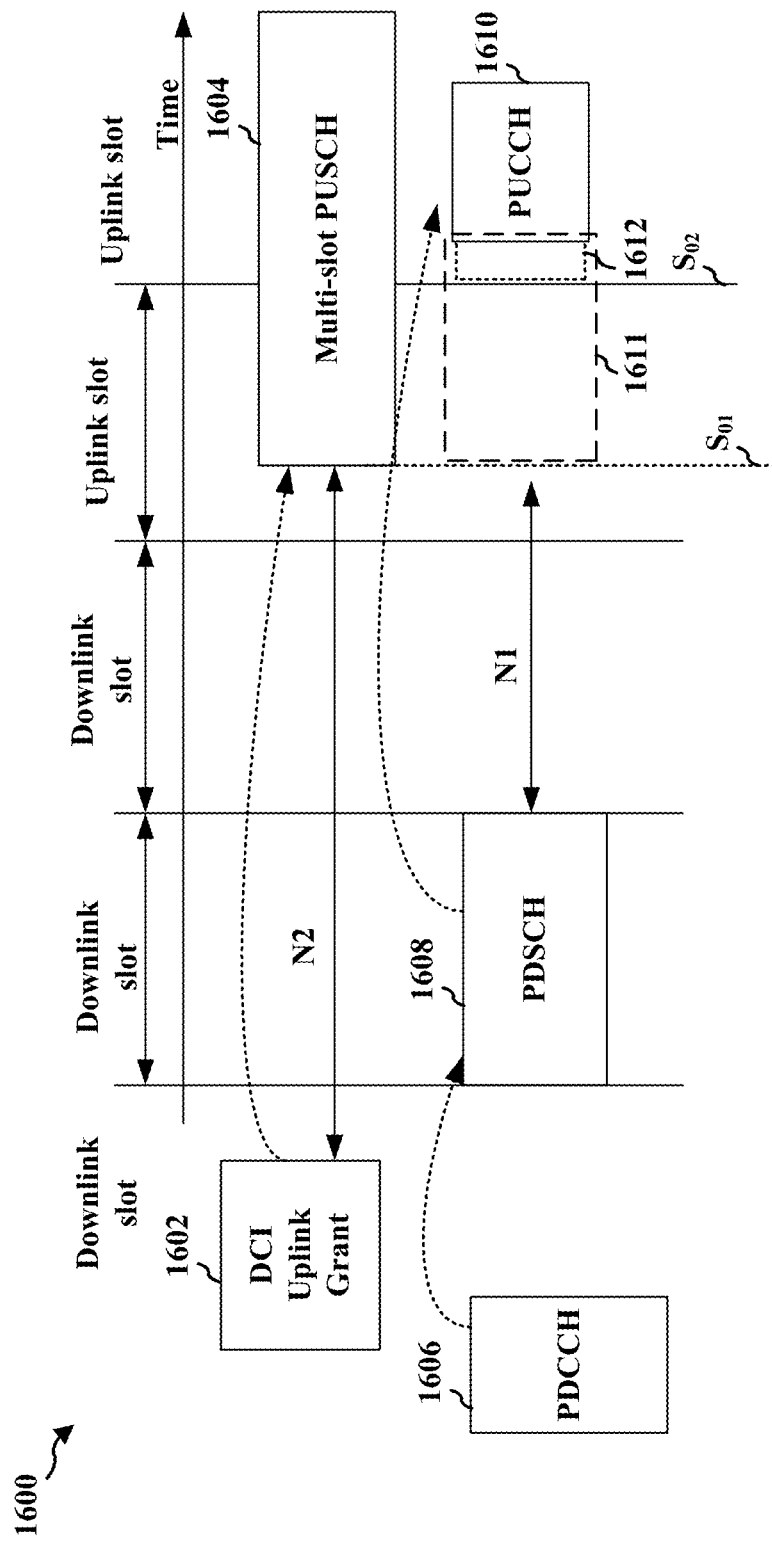
FIG. 16 illustrates example processing timeline considerations for multiplexing UCI with a multiple slot PUSCH transmission, in accordance with various aspects of the present disclosure.

FIG. 16. Illustrates a diagram 1600 showing aspects of timeline considerations for multiplexing UCI in a multiple slot PUSCH transmission. As illustrated in FIG. 16, a UE may consider multiplexing UCI for transmission in PUCCH 1610 that overlaps in time with a transmission occasions for a multiple slot PUSCH 1604. In FIG. 16, the PUCCH 1610 overlaps the PUSCH 1604, e.g., at 1612, in a subsequent slot of the multiple slot transmission occasion rather than in a first slot, as in FIG. 15, and is multiplexed in the overlapped slot. FIG. 12 illustrates an example of UCI overlapping a second slot of a multiple slot PUSCH transmission occasion 1202 and being multiplexed in the second slot.

In FIG. 16, if the PUCCH 1610 overlap occurs in the second or subsequent slots of multi-slot PUSCH transmission 1604 and the UCI is multiplexed within that slot based on a per transmission occasion basis, the reference time $S_{01}$ may be determined by the start of the multi-slot PUSCH transmission, e.g., as shown at 1611. In some aspects, $S_{01}$ may be applicable if rate matching and interleaving are performed on a per transmission occasion basis. A single interleaver may be applied per transmission occasion in this example with $S_{01}$.

In contrast, if the PUCCH 1610 overlap occurs in the second or subsequent slots of multi-slot PUSCH transmission 1604 and the UCI is multiplexed within that slot, the reference time $S_{02}$ is based on that slot of the multi-slot PUSCH transmission, e.g., as shown at 1611. In some aspects, $S_{02}$ may be applicable if rate matching and interleaving are performed on a per slot basis. In a timeline with $S_{02}$, a single interleaver may be applied per slot for the multiple slot PUSCH transmission 1604.

If the PUCCH 1610 overlap occurs in a second or subsequent slot of the transmission occasion for the multiple slot PUSCH transmission 1604, and the UCI is multiplexed across the transmission occasion, rather than per slot, the reference time may be $S_{01}$ and based on the start of the multiple slot PUSCH transmission 1604.

As described in connection with FIG. 15, the time gap between the DCI 1602 scheduling the multiple slot PUSCH transmission 1604 may meet N2 symbols in order to transmit the PUSCH 1604, and the DCI 1606 scheduling the PDSCH 1608 for which the UE is planning to transmit the UCI in the PUCCH 1610 may be received before the DCI 1602 in order to multiplex the UCI with the PUSCH 1604.

Figure 17:
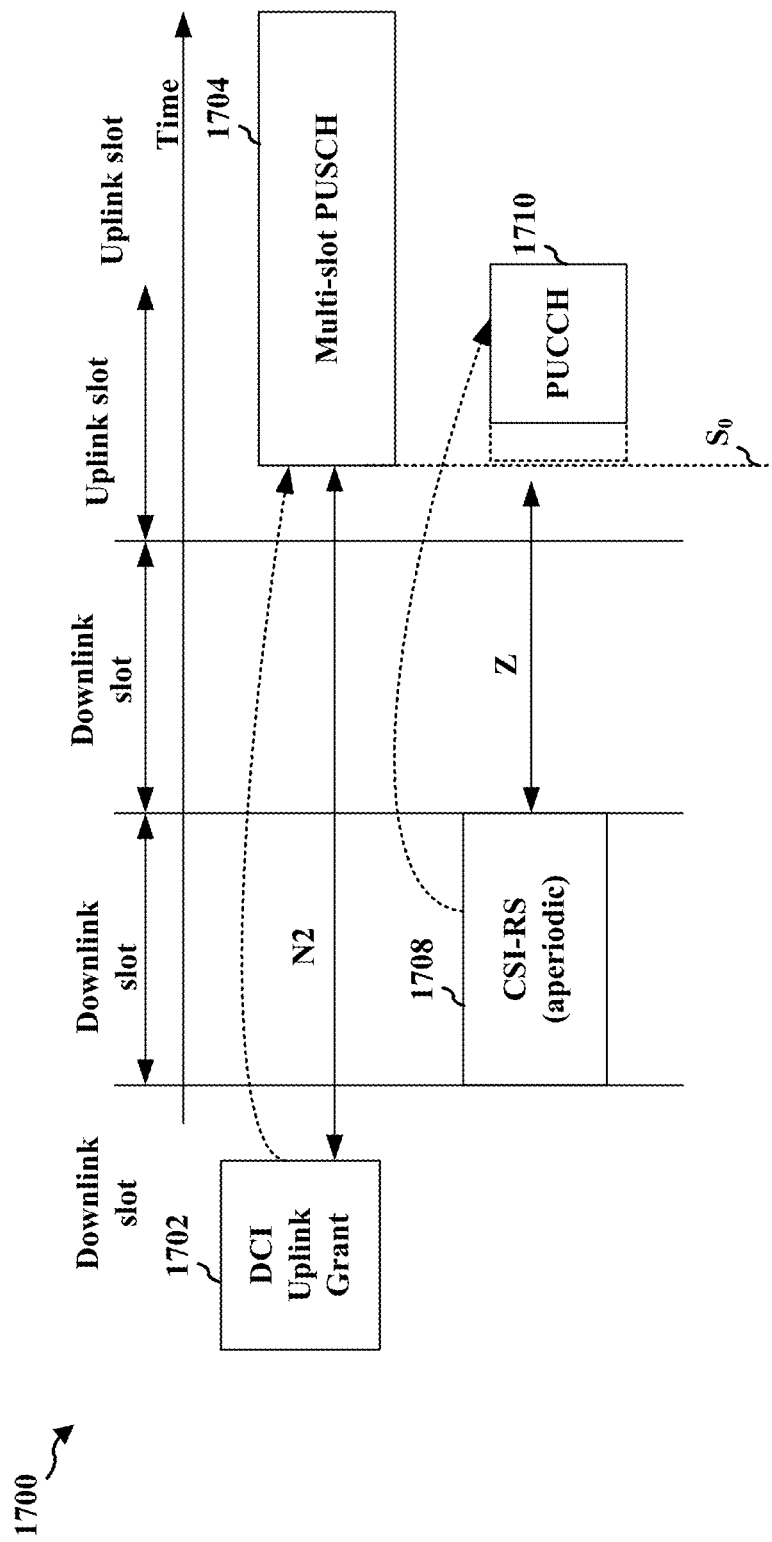
FIG. 17 illustrates example processing timeline considerations for multiplexing UCI with a multiple slot PUSCH transmission, in accordance with various aspects of the present disclosure.

FIG. 17 illustrates an example 1700 similar to FIG. 15 for UCI based on CSI-RS, such as aperiodic CSI-RS 1708 that overlaps in time in a first symbol of the multiple slot PUSCH transmission 1704. The gap N2 between the DCI 1702 and the scheduled multiple slot PUSCH transmission 1704 may be the same as in FIG. 15. For a CSI report comprised in the PUCCH 1710, the minimum gap (Z) may be measured between a last symbol of the CSI-RS 1708 and the start of the PUCCH 1710 carrying the CSI report. If the PUCCH 1710 is less than Z symbols from the last symbol of the CSI-RS, the UE may not multiplex the CSI report with the multiple slot PUSCH transmission 1704. If the time gap is at least Z symbols, the UE may multiplex the CSI report with the PUSCH 1704. The additional aspects, e.g., described in connection with FIG. 16 may similarly be applied for UCI based on CSI, e.g., from a last symbol of the received CSI-RS to the reference symbol Sot.

Figure 18:
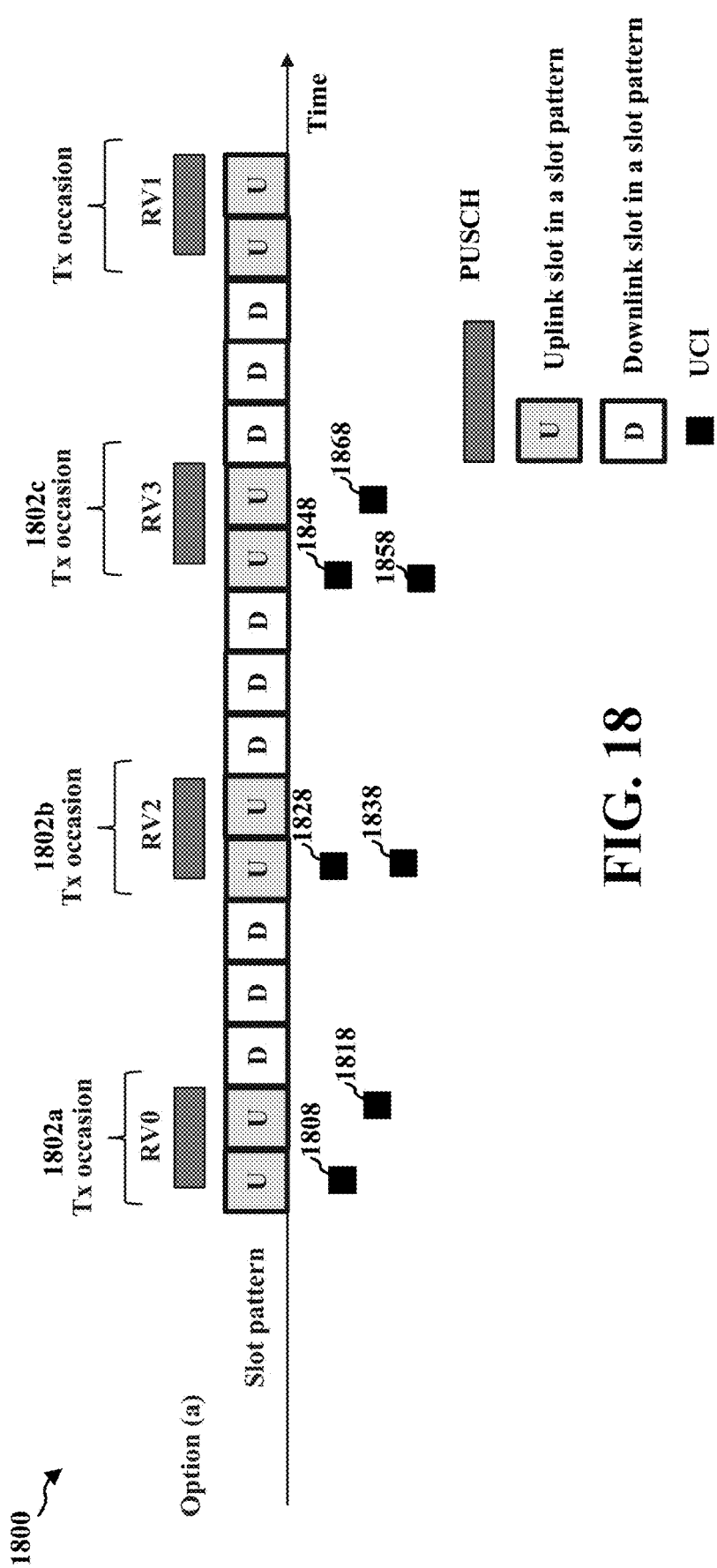
FIG. 18 illustrates an example of multiple UCI overlapping a transmission occasion for a multiple slot PUSCH transmission, the transmission occasion having contiguous resources, in accordance with various aspects of the present disclosure.

FIG. 18 illustrates a diagram 1800 showing multiple PUCCHs (e.g., UCI 1808, 1818, 1828, 1838, 1848, 1858, 1868) that overlap in various combinations with transmission occasions for multiple slot PUSCH transmissions. For example, transmission occasion 1802a overlaps with PUCCH for UCI 1808 in slot 0 of the transmission occasion and with PUCCH for UCI 1818 in slot 1 of the transmission occasion, e.g., an overlap of single UCI with different slots of the transmission occasion 1802a. The transmission occasion 1802b has a single slot that is overlapped with multiple PUCCHs, e.g., for UCI 1828 and 1838. The transmission occasion 1802c has an overlap of UCI 1848 and 1858 in one slot and UCI 1868 in another slot of the transmission occasion 1802c.

When multiplexing multiple UCI for multiple PUCCHs in a single transmission occasion comprising multiple slots for PUSCH transmission, the UE may handle the overlap on a per slot basis, and may multiplex the UCI with the PUSCH on a per slot basis.

In other aspects, when multiplexing multiple UCI for multiple PUCCHs in a single transmission occasion comprising multiple slots for PUSCH transmission, the UE may handle the overlap across the transmission occasion. The UE may multiplex the UCI across the transmission occasion, e.g. even if the PUCCHs do not occur in the same slot of the transmission occasion, such as with UCI 1808 and 1818, or with UCI 1848 and UCI 1868. In some aspects, the UE may jointly multiplex the UCI.

Figure 19:
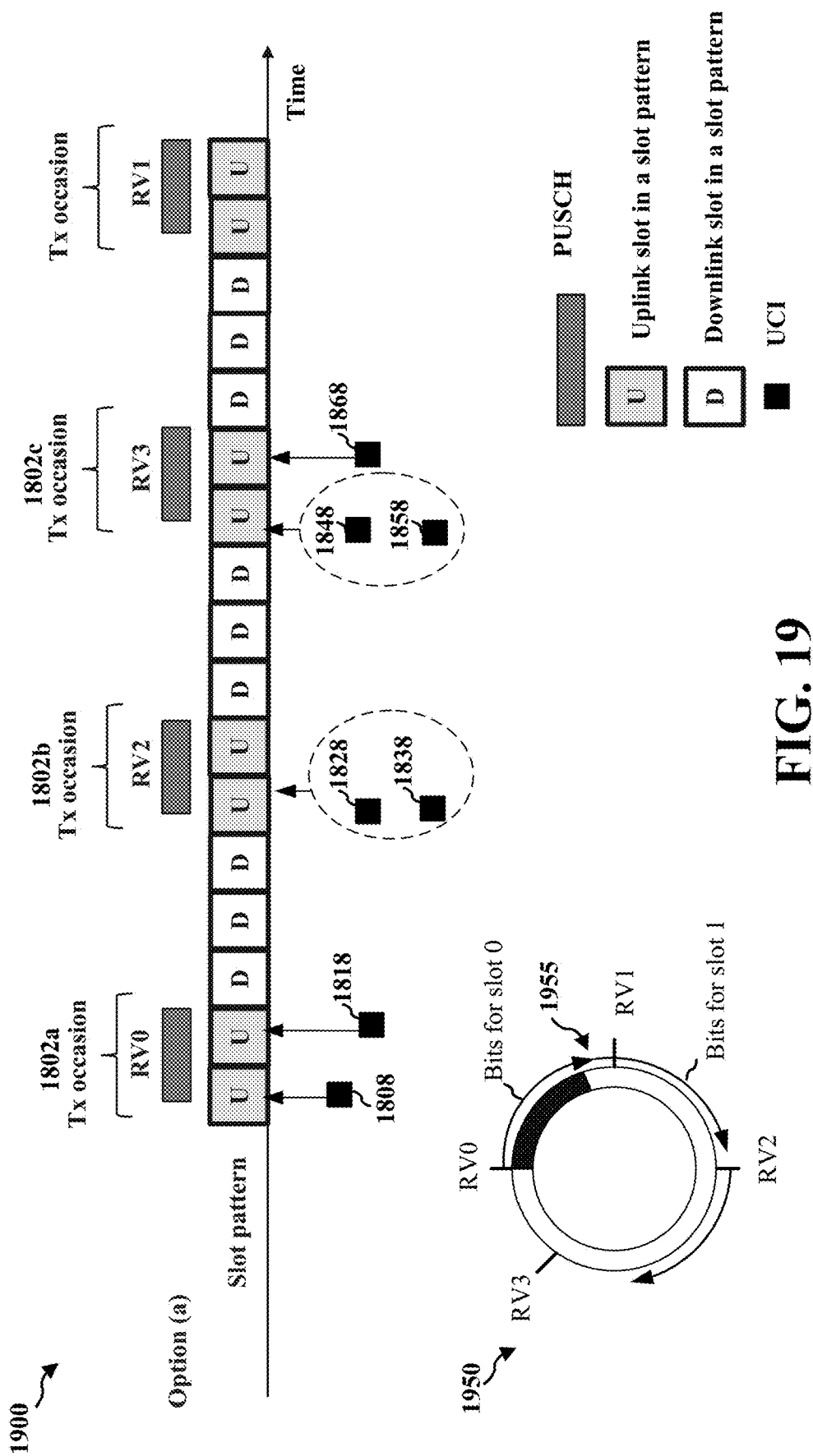
FIG. 19 illustrates an example of multiplexing multiple UCI overlapping a transmission occasion for a multiple slot PUSCH transmission on an overlapped slot basis, in accordance with various aspects of the present disclosure.

If the overlapping UCI is handled on a per slot basis, the UE may multiplex the UCI, whether a single UCI or multiple overlapping UCI within the corresponding slot of the transmission occasion that is overlapped. FIG. 19 illustrates a diagram 1900 showing with arrows the slot in which the UCI in FIG. 18 is handled/multiplexed in the per slot example. The PUSCH may be rate matched on a per slot basis. Between slots, the UE may remember, or store, the starting position in the circular buffer. For example, the circular buffer 1950 in FIG. 19 illustrates a point 1955 for the bits between slot 0 and slot 1. The PUSCH may be interleaved on a per slot basis, e.g., as described in connection with FIG. 7.

Figure 20:
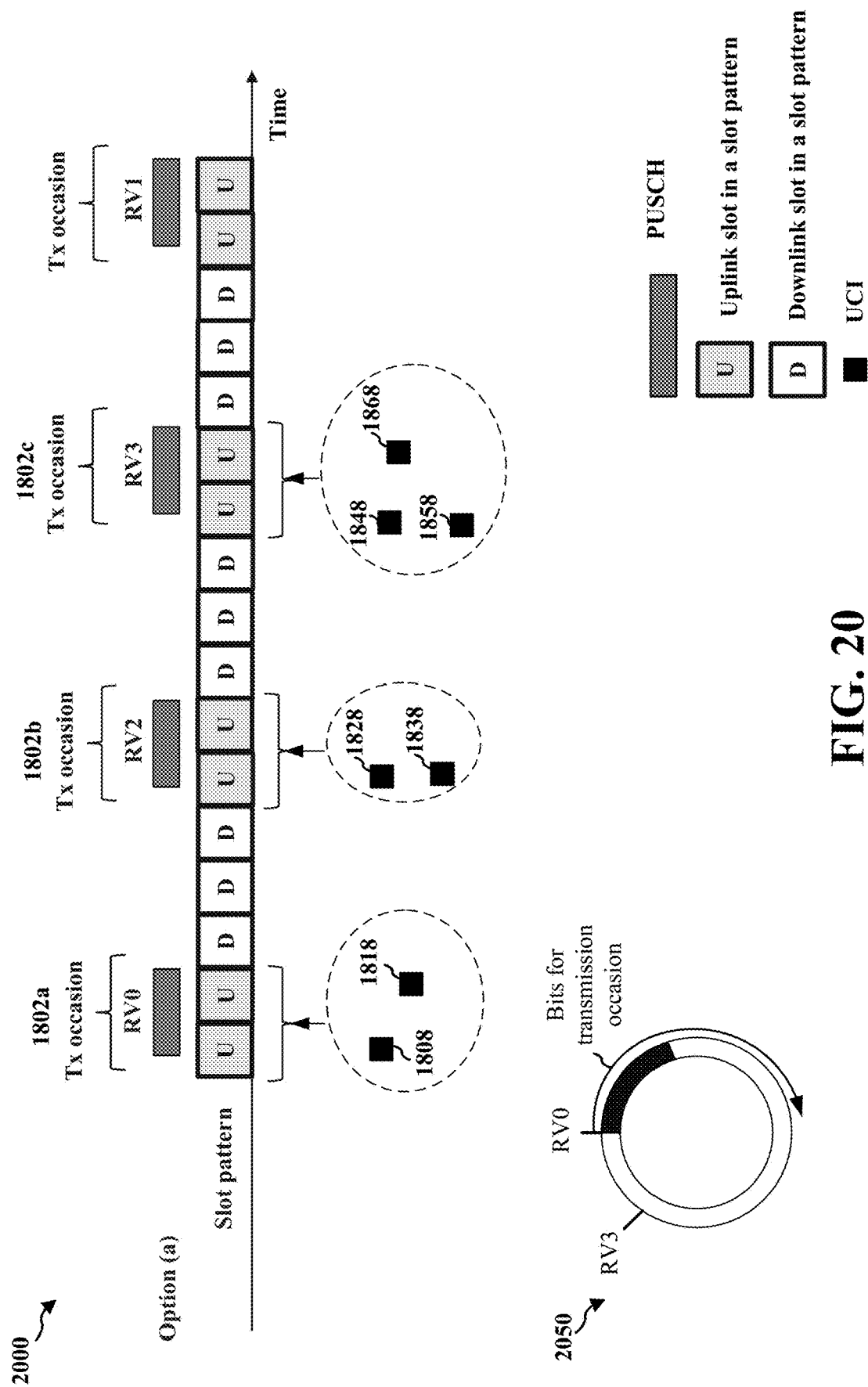
FIG. 20 illustrates an example of multiplexing multiple UCI overlapping a transmission occasion for a multiple slot PUSCH transmission on transmission occasion basis, in accordance with various aspects of the present disclosure.

If the overlapping UCI is handled across the transmission occasion, even if the PUCCHs do not occur within the same slot, they may influence each other's multiplexing. The UE may determine the UCI resources for multiplexing purposes at the beginning of the transmission occasion. For timeline purposes, the UE may look at an overlap in slot 1 prior to the beginning of the transmission occasion. For PUSCH handling, the UE may rate match the PUSCH across the entire transmission occasion. The UE may interleave the PUSCH across the transmission occasion, such as described in connection with FIG. 6. FIG. 20 illustrates a diagram 2000 showing, with arrows, the UCI in FIG. 18 being handled per transmission occasion. The PUSCH may be rate matched on a per slot basis. For example, the circular buffer 2050 in FIG. 20 illustrates application of the circular buffer for the combined bits of the transmission occasion.

Figure 21:
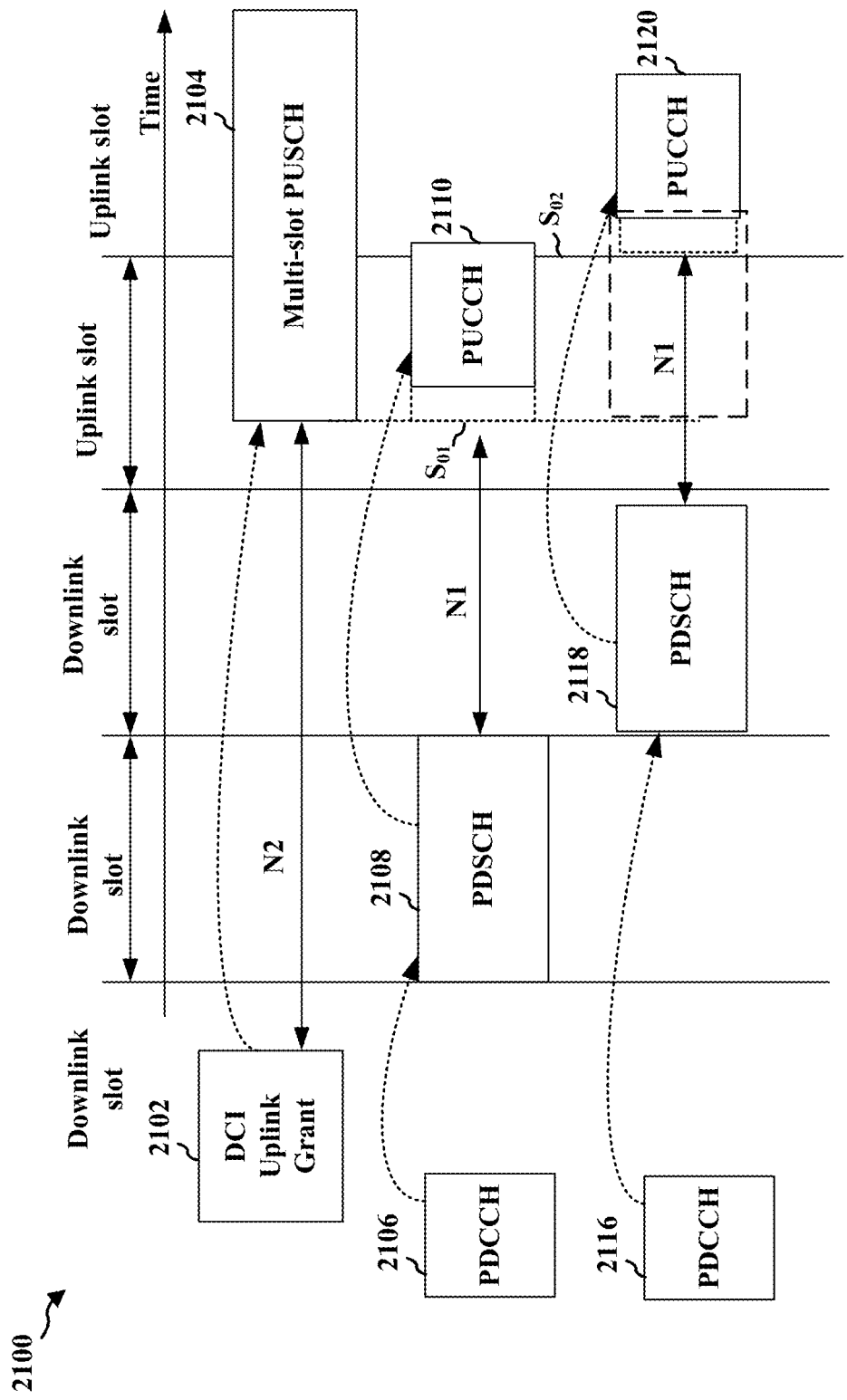
FIG. 21 illustrates example processing timeline considerations for multiplexing UCI from multiple PUCCHs with a multiple slot PUSCH transmission, in accordance with various aspects of the present disclosure.

FIG. 21 illustrates a diagram 2100 showing aspects of timeline considerations for multiplexing multiple UCI in a multiple slot PUSCH transmission 2104. As illustrated in FIG. 21, a UE may consider multiplexing UCI for transmission in PUCCH 2110 and/or 2120 that overlaps in time with a transmission occasions for a multiple slot PUSCH 2104. In FIG. 21, the PUCCH 2110 overlaps the PUSCH 2104 in a first slot of the multiple slot transmission occasion rather similar to FIG. 15. The PUCCH 2120 overlaps the PUSCH 2104 in a subsequent slot of the multiple slot transmission occasion rather than in a first slot. Both PUCCH 2110 and 2120 are scheduled by DCI 2106 and 2116 scheduling the PDSCH 2108 and 2118 are received before the uplink grant 2102 scheduling the PUSCH 2104, and therefore meet that threshold for being multiplexed with the PUSCH 2104. In some aspects, the reference time may be based on start of the multi-slot PUSCH 2104 (e.g., $S_{01}$) irrespective of how and/or where the UCI is multiplexed. For example, the UE may prepare for the multi-slot PUSCH transmission ahead of time, and may apply the timeline considerations for each of the multiple PUCCHs (2110 and 2120) based on the start of multi-slot PUSCH 1604 as a reference $S_{01}$.

In some aspects, the reference for multiplexing each PUCCH may be based on a slot of multiplexing. For example, each of multiple PUCCHs may independently have a reference time based on the slot of multiplexing, or based on other considerations described in connection with FIGS. 15-17 for individual PUCCH. For example, the reference time for PUCCH 2120 may be $S_{02}$, whereas the reference time for PUCCH 2110 may be $S_{01}$. In some examples, the determination of different reference times may be based on an interleaving and rate matching configuration. For example, the independent determination of the reference time per PUCCH may be applied if the different PUCCH are multiplexed on a per slot basis, e.g., with rate matching on a per slot basis, and/or interleaving on a per slot basis, such as described in connection with FIG. 19.

If the multiplexing of the multiple UCI is handled across the transmission occasion rather than per slot, e.g., as described in connection with FIG. 20, the UE may apply a common reference time of $S_{01}$ to each of the PUCCHs based on the start of the multiple slot PUSCH 2104. The start of the PUSCH may be applied as the reference time because the UCI multiplexing decisions may be made in a joint manner for the different PUCCHs. The common reference time may enable the UE to prepare for the multiple slot PUSCH transmission in advance.

Figure 22:
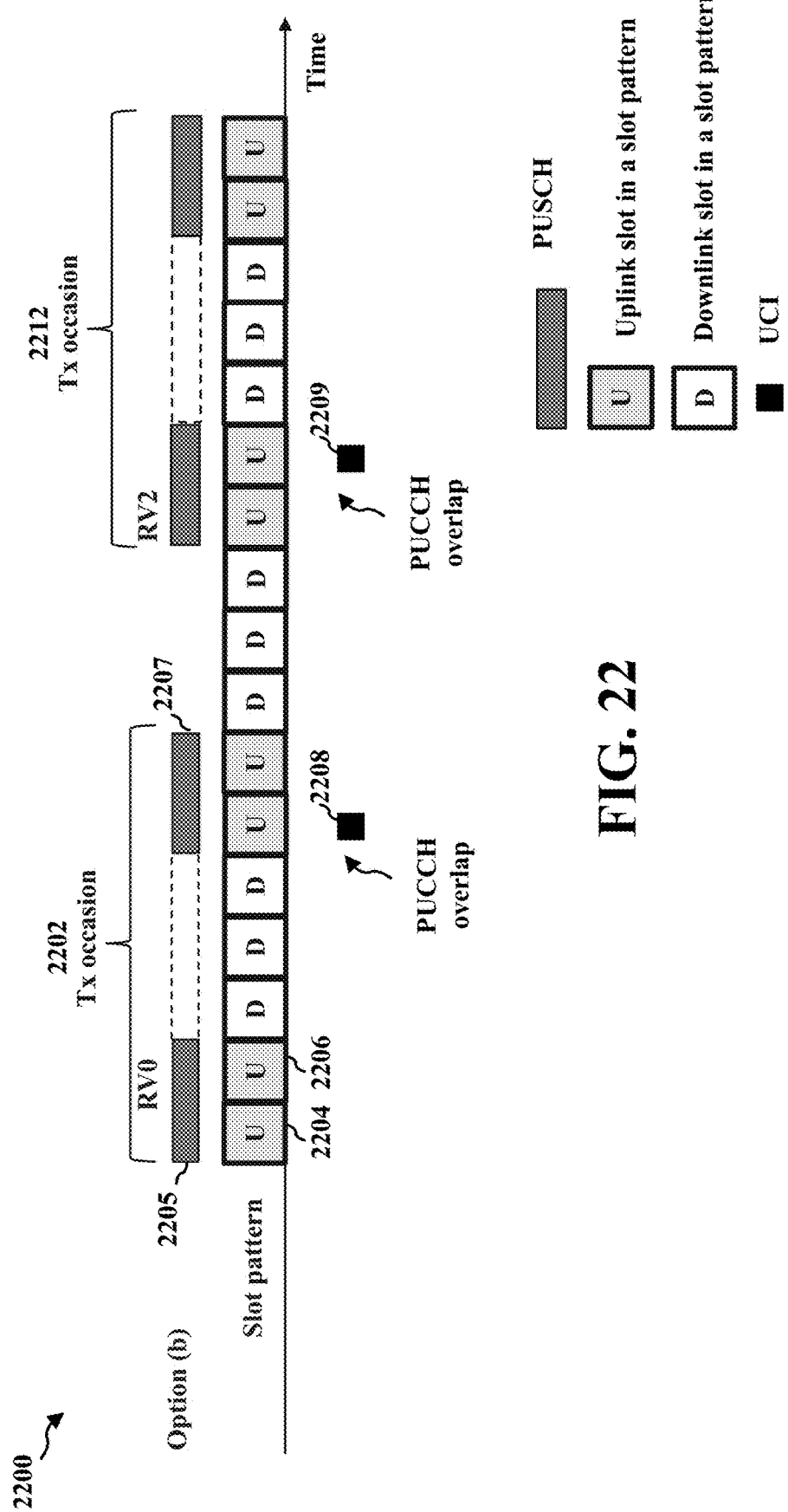
FIG. 22 illustrates an example of UCI overlapping in time with a transmission occasion for a multiple slot PUSCH transmission, the transmission occasion having non-contiguous segments of resources, in accordance with various aspects of the present disclosure.

FIG. 22 illustrates a diagram 2200 showing PUCCH resources for UCI 2208 and 2209 that overlap with transmission occasions 2202 and 2212 that include non-contiguous segments of resources, e.g., option (b) described in connection with FIG. 4. For example, the transmission occasion 2202 includes segment 2205 and segment 2207 that are separated in time by resources that are not included in the transmission occasion 2202. The segments 2205 and 2207 each include a contiguous set of resources. For example, the segment 2205 is illustrated as having resources in a first slot 2204 and a second slot 2206. Each transmission occasion, e.g., 2202 and 2212, may be handled independently for the purpose of multiplexing UCI with the PUSCH that is transmitted over the multiple slots of one transmission occasion. The per transmission occasion may have aspects that correspond to the per slot handling of PUSCH and PUCCH. In some aspects, each contiguous segment within a transmission occasion may be handled independent of the other segment(s).

In some aspects, the UE may consider, e.g., handle or apply, multiplexing the PUCCH within the slot of overlap, and not within the non-overlapped slot(s). The aspects of the multiplexing in this example may be applied similar to the multiplexing within the overlapped slot for a contiguous transmission occasion, e.g., such as described in connection with example 1 and example 3 in table 1, as well as FIGS. 10 and 12.

In some aspects, the UE may consider, e.g., handle or apply, multiplexing over an entire transmission occasion, e.g., 2202, including non-contiguous segments 2205 and 2207. The aspects of the multiplexing in this example may be applied similar to the multiplexing over the transmission occasion for a contiguous transmission occasion, e.g., such as described in connection with example 2 and example 4 in table 1, as well as FIGS. 11 and 13.

In some aspects, the UE may consider, e.g., handle or apply, multiplexing over a contiguous portion of a transmission occasion, e.g., within overlapped segment 2207 of the transmission occasion 2202. Table 2 illustrates example aspects of handling UCI multiplexing with a multiple slot PUSCH per segment of a transmission occasion including non-contiguous segments of resources for UCI 2208.

TABLE 2

| | Overlapping slot | Multiplexing slot/TO | Multiplexing slot/TO | Timeline |
|---|---|---|---|---|
| Ex. 1 | Slot 5 | TO segment in slot 5 and 6 | Per-slot rate matching and interleaving, Or Per slot RV cycling Or Or Per-TO rate matching and interplexing, Or Per-TO RV cycling | Slot 5 based or beginning of TO |

Figure 23:
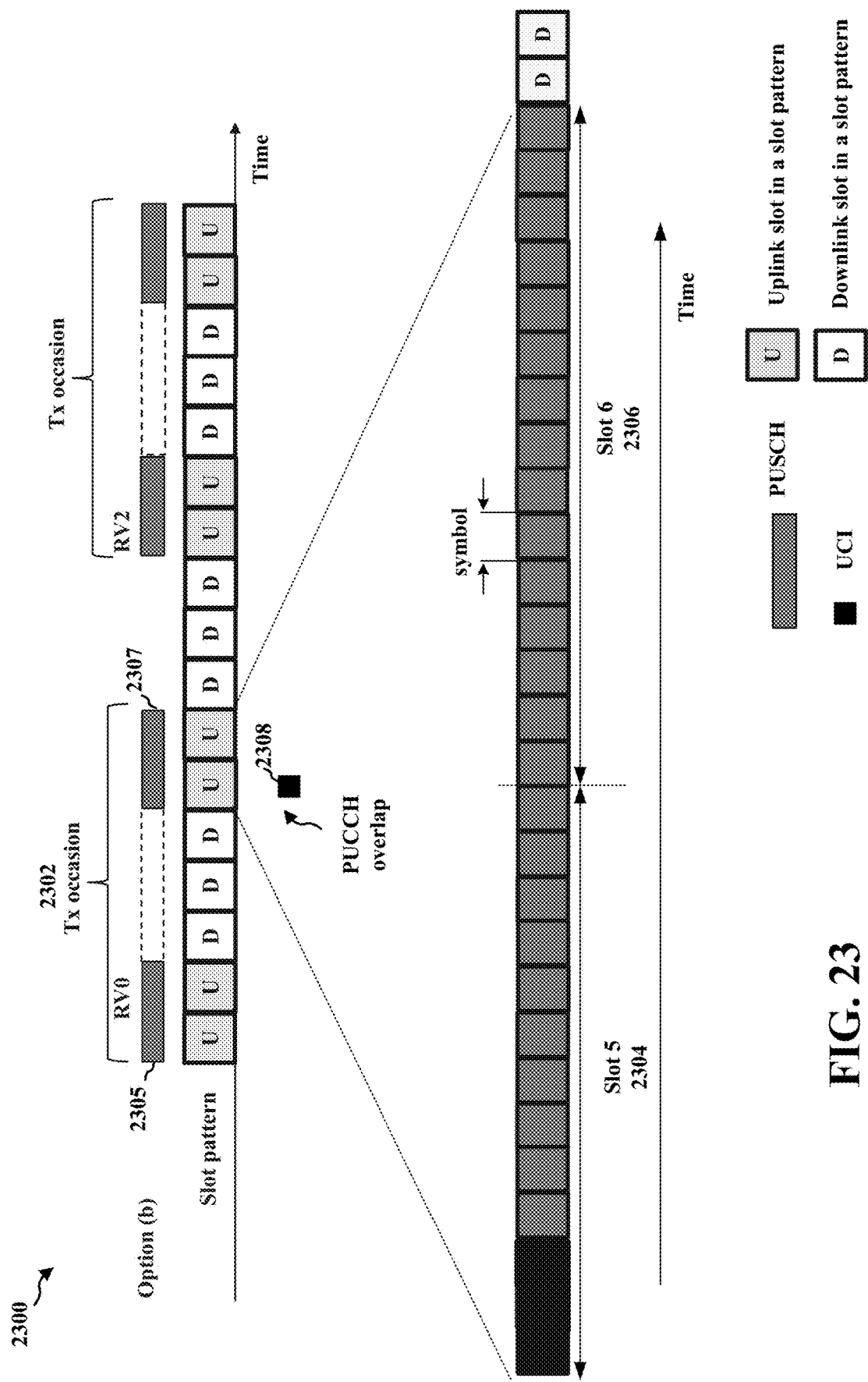
FIG. 23 illustrates an example of multiplexing UCI overlapping a transmission occasion for a multiple slot PUSCH transmission on segment basis, the transmission occasion having non-contiguous segments of resources, in accordance with various aspects of the present disclosure.

FIG. 23 illustrates a diagram 2300 showing UCI multiplexed based on an overlapped segment of a non-contiguous transmission occasion 2302. The transmission occasion includes non-contiguous segments 2305 and 2307. Segment 2307 is overlapped in time with a PUCCH for the transmission of UCI 1908. Based on the overlap, the UCI 2308 may be multiplexed with a PUSCH TB for transmission in the transmission occasion. The multiplexing may be handled per segment, with the multiplexing in segment 2307 being handled independently of processing for segment 2305. The segment 2307 includes resources spanning two slots, e.g., slot 5 2304 and slot 6 2306. The resources for multiplexing the UCI 2308 may be determined based on the segment within which the PUCCH is multiplexed. The UCI resources may be determined based on the segment's resources.

As an example, the number of resources for multiplexing the UCI may be determined based on a number of REs potentially available for the UCI across the PUSCH symbols in the corresponding segment of the transmission occasion. The determination may also be based on a total number of PUSCH bits scaled by a number of symbols in the corresponding segment and the total number of PUSCH symbols. For example, in equation 1, $$\sum_{l=0}^{N_{symb,all-1}^{PUSCH}-1} M_{sc}^{UCI}(l)$$

in equation 1 may correspond to a number of REs potentially available for the UCI 2308 across the PUSCH symbols of the corresponding segment of the transmission occasion (e.g., segment 2307 of transmission occasion 2302), and $$\sum_{r=0}^{C_{UL-SCH}-1} K_r$$

in equation 1 may correspond to a total number of PUSCH bits of the transmission occasion 2302 scaled by a number of symbols in the corresponding segment divided by the total number of PUSCH symbols in the transmission occasion.

After determining the number of resources to use for the UCI 2308 in slot 5 in FIG. 23, the UE may identify a location of the UCI resources within slot 5 2304. The UE may then fill the identified resources in slot 5 2304 with the UCI symbols. The UE may fill the resources in a frequency first, time second manner. The UE may determine PUSCH rate matching bits using remaining resources and may interleave the rate matched bits. After interleaving, the UE may fill the resources identified for the PUSCH with the interleaved bits mapped to modulation symbols.

Figure 24:
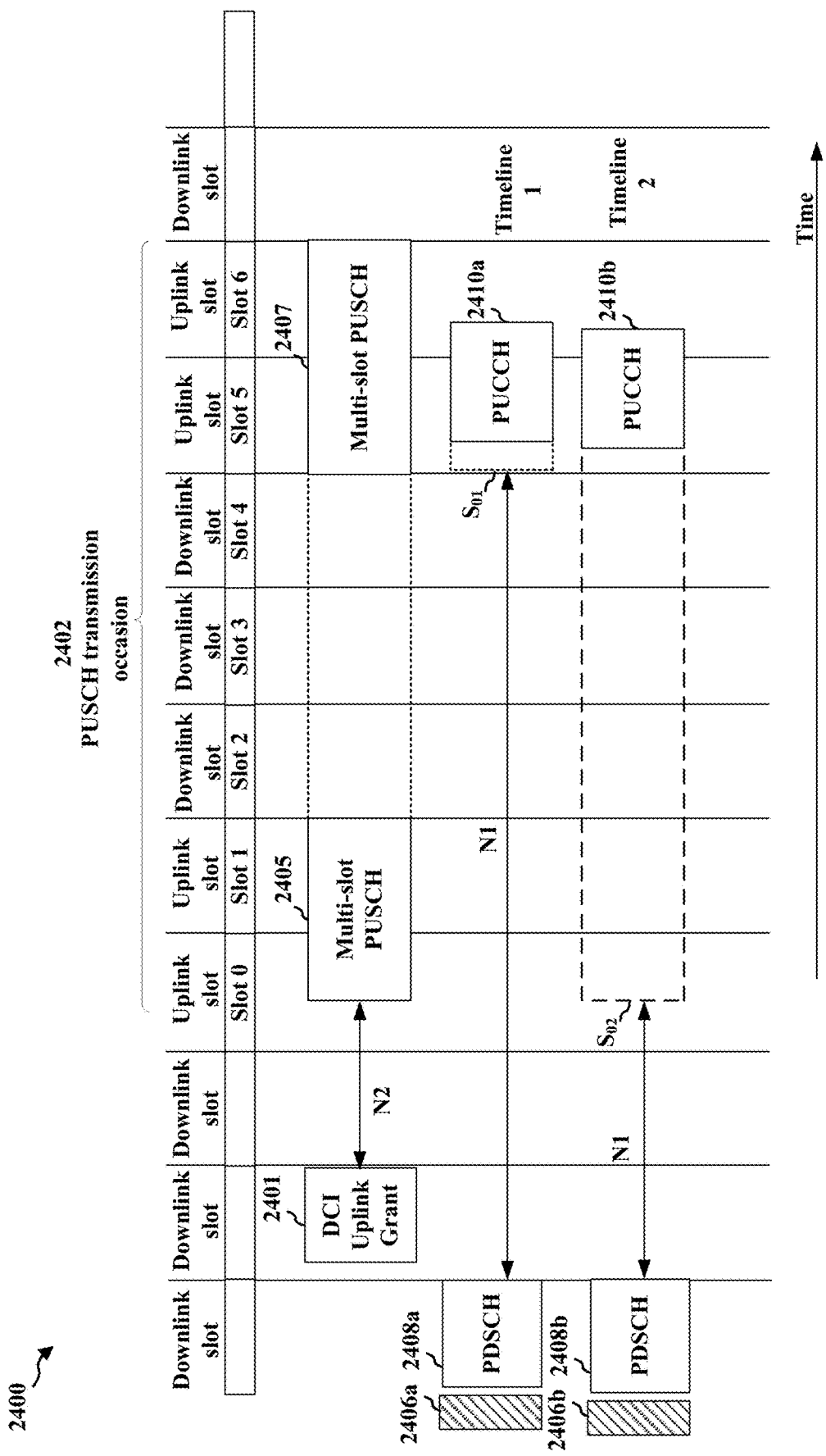
FIG. 24 illustrates example processing timeline considerations for multiplexing UCI with a multiple slot PUSCH transmission in a transmission occasion having non-contiguous segments, in accordance with various aspects of the present disclosure.

FIG. 24 shows a diagram 2400 with two potential timelines for a PUCCH that overlaps with a transmission occasion 2402 having non-contiguous segments, e.g., based on option (b) described in connection with FIG. 4 and/or FIG. 23. The transmission occasion 2402 includes non-contiguous segments 2405 and 2407. Each segment includes a contiguous set of resources, e.g., segment 2405 including resources in slot 0 and slot 1 of the set of slots spanned by the transmission occasion 2402 and segment 2407 including resources in slot 5 and 6, similar to the example in FIG. 23. The multiple slot PUSCH transmission may be scheduled by DCI 2401 with an uplink grant, and may have a processing timeline based on N2, as described in connection with FIGS. 15-17.

FIG. 24 illustrates two examples of potential timelines for a PUCCH 2410a or 2410b that overlaps with the transmission occasion 2402 for the multiple slot PUSCH. The PUCCH may include UCI such as ACK/NACK for PDSCH 2408a or 2408b, which may be scheduled by a downlink grant in DCI 2406a or 2406b.

In a first timeline example, the reference time for the measurement of N1, and/or Z if the UCI includes CSI, may be based on a segment within which the PUCCH is to be multiplexed. The reference time may be mapped to a start of the segment, e.g., as shown by $S_{01}$ in FIG. 24. The use of timeline 1 may be based on an interleaving and rate matching configuration for the PUSCH with the multiplexed UCI, e.g., such as being per segment based or per slot based.

In a second example timeline, the reference time for the measurement of N1 and/or Z may be based on the start of the multiple slot PUSCH, e.g., as shown by $S_{02}$ in FIG. 24. In some aspects, the reference time $S_{02}$ may be applied by the UE irrespective of how or where the UCI will be multiplexed within the multiple slot PUSCH transmission. Using a reference time at the beginning of the multiple slot PUSCH transmission may provide the UE with added time to prepare for the multiple slot PUSCH.

Figure 25:
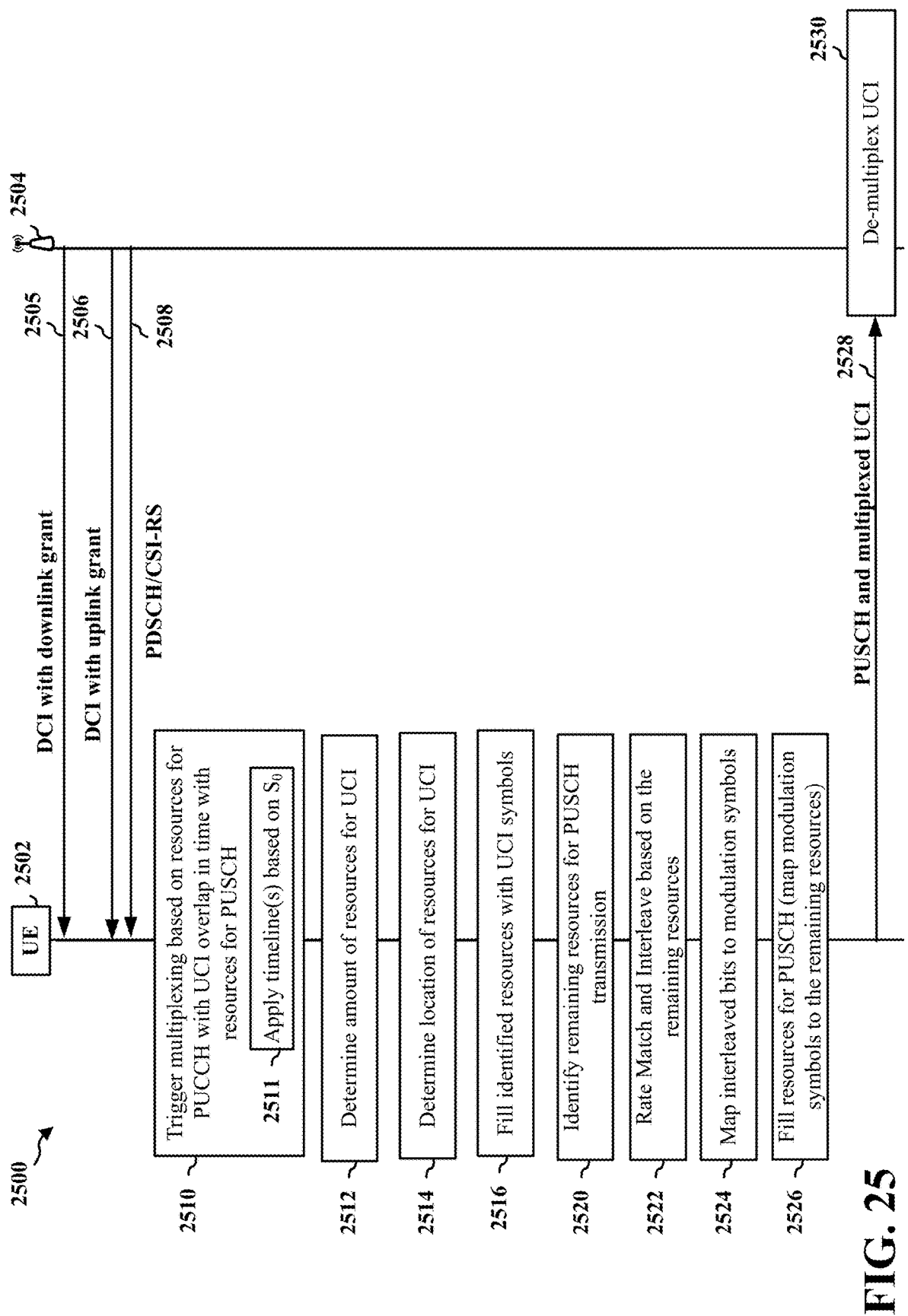
FIG. 25 is an example communication flow between a UE and a base station including the application of a processing timeline for multiplexing with a multiple slot PUSCH transmission, in accordance with various aspects of the present disclosure.

FIG. 25 illustrates an example communication flow 2500 between a UE 2502 and a base station 2504 including the transmission of UCI multiplexed with a multiple slot PUSCH transmission 2528. As illustrated at 2506, the base station 2504 may transmit DCI that allocate, or grant, resources to the UE 2502 for a PUSCH transmission. The allocated resources may include a transmission occasion spanning multiple slots, such as described in connection with FIG. 4. At 2510, the UE may trigger multiplexing of UCI with the multiple slot PUSCH transmission based on determining an overlap in time between PUCCH resources for the UCI and the transmission occasion for the PUSCH. As a non-limiting example to illustrate the concept, the UE may receive a downlink transmission 2508 for which the UE has UCI to transmit to the base station 2504. The downlink transmission may include PDSCH, which may be transmitted before or after the uplink grant, at 2506. The UE may have ACK/NACK information about the PDSCH to transmit as the UCI that overlaps the resources for the PUSCH. The PDSCH may be based on DCI 2505 that schedules the PDSCH, and which may be received prior to the DCI with the uplink grant, at 2506. As another example, the downlink transmission 2508 may include CSI-RS, and the UE may have CSI to report to the base station as UCI.

As a part of determining to multiplex the UCI with the multiple slot PUSCH transmission, at 2510, the UE may apply a processing timeline. The processing timeline may be based on N1 and/or Z, such as described in connection with any of FIG. 15-17, 21, or 24. The UE may apply a reference time (e.g., $S_0$, $S_{O1}$, or $S_{O2}$) for the processing timeline, e.g., when determining whether N1 or Z for the PUCCH associated with the UCI meets the minimum gap for multiplexing the UCI with the PUSCH.

As illustrated at 2512, in order to multiplex the UCI with the PUSCH transmission, the UE may determine the amount of resources for the UCI. The UE may determine the resources based on the type of transmission occasion (e.g., contiguous or non-contiguous segments, such as described in connection with FIG. 4). The UE may also determine the resources based on whether multiplexing is handled per slot, per transmission occasion, or per segment of a transmission occasion. The UE may also determine the resources based on whether the overlap occurs in a first slot of a transmission occasion, or segment, or in a subsequent slot. The determination may be based on any of the aspects described in connection with FIGS. 10-14, 18-20, and/or 22-23. The determination may be based on the modified aspects of equation 1, as described herein.

At 2514, the UE may determine the location of the resources for the UCI within the PUSCH transmission occasion. At 2516, the UE may fill the identified resources with the UCI symbols. In some aspects, the UE may fill the resources in a frequency first, time second manner. At 2520, the UE identifies the remaining resources of the transmission occasion that are available for the PUSCH transmission, e.g., remaining after filling part of the resources of the transmission occasion with the UCI. At 2522, the UE applies rate matching and interleaving based on the remaining resources. The rate matching and interleaving may be based on any of the aspects described in connection with the examples in FIGS. 4-24. As an example, the interleaving may be per slot, as in FIG. 7, per transmission occasion, as in FIG. 6, or per segment, as in FIG. 8. The type of rate matching and interleaving may be based on the type of transmission occasion and the manner in which the UCI is multiplexed, as described herein. At 2524, the UE maps the interleaved bits to modulation symbols, and at 2526, the UE fills the remaining resources of the transmission occasion with the PUSCH transmission by mapping the modulation symbols, mapped at 2524, to the remaining resources of the transmission occasion. At 2528, the UE 2502 transmits the PUSCH and the multiplexed UCI to the base station 2504. As illustrated at 2530, the base station may de-multiplex the UCI from the PUSCH in order to obtain the information in the UCI.

Figures 26A, 26B:
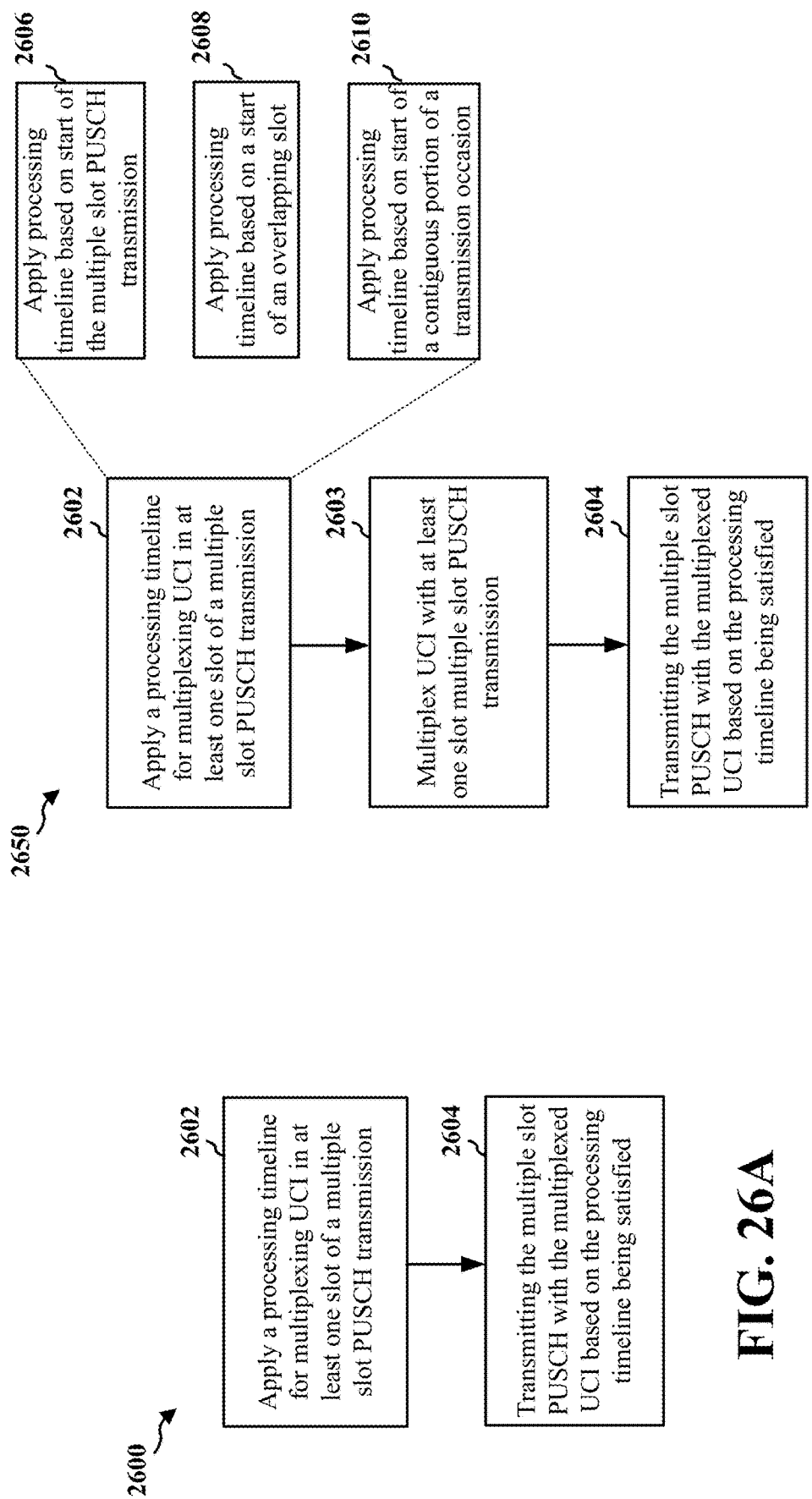
FIGS. 26A and 26B are flowcharts of methods of wireless communication including the application of a processing timeline for multiplexing with a multiple slot PUSCH transmission, in accordance with various aspects of the present disclosure.

FIG. 26A is a flowchart 2600 of a method of wireless communication. The method may be performed by a UE (e.g., the UE 104, 350, 2502; the apparatus 2702). The method may enable the UE to multiplex UCI within a transmission occasion for a multiple slot PUSCH and provides a processing timeline for the UE to multiplex the UCI with the multiple slot PUSCH.

At 2602, the UE applies a processing timeline for multiplexing UCI in at least one slot of a multiple slot PUSCH transmission. FIG. 25 illustrates an example of the UE 2502 applying the processing timeline, at 2511. The processing timeline may be based on any of the aspects described in connection with FIGS. 15-17, 21, and/or 24. The application of the timeline may be performed, e.g., by the timeline component 2744 of the apparatus 2702 in FIG. 27.

At 2604, the UE transmits the multiple slot PUSCH transmission with multiplexed UCI based on the processing timeline being satisfied. The multiplexing and/or the transmission may be based on any of the aspects described in connection with FIGS. 4-25. FIG. 25 illustrates an example of the UE 2502 transmitting PUSCH with multiplexed UCI to a base station 2504, at 2528. The transmission may be performed, e.g., by the PUSCH component 2742 of the apparatus 2702, e.g., via the transmission component 2734 and/or the RF transceiver 2722.

FIG. 26B is a flowchart 2650 of a method of wireless communication. The method may be performed by a UE (e.g., the UE 104, 350, 2502; the apparatus 2702). The method may include 2602 and 2604, as described in connection with FIG. 26B.

In some aspects, the UCI may comprise HARQ feedback, and the processing timeline may correspond to a time gap (e.g., N1) between reception of a PDSCH and a start of a PUCCH carrying a HARQ feedback payload for the PDSCH.

In some aspects, the UCI may comprise a CSI report, and the processing timeline may correspond to a time gap (e.g., Z) between reception of a last symbol of a CSI-RS and a start of a PUCCH carrying the CSI report based on measurement of the CSI-RS, e.g., as described in connection with FIG. 17.

In some aspects, the UE may apply the processing timeline based on a start of the multiple slot PUSCH transmission, as illustrated at 2606. In some aspects, the multiple slot PUSCH transmission may be transmitted in a transmission occasion comprising a set of contiguous slots. In some aspects, the processing timeline is based on the start of the multiple slot PUSCH transmission based on one or more of: an overlapped slot of the multiple slot PUSCH transmission that overlaps in time with the UCI, a multiplexing slot in which the UCI is to be multiplexed in the multiple slot PUSCH transmission, a transmission occasion based multiplexing for the UCI within the multiple slot PUSCH transmission, a transmission occasion based interleaving for the multiple slot PUSCH transmission, or a transmission occasion based rate matching for the multiple slot PUSCH transmission. As an example, the timeline may be based on a start of the multiple slot PUSCH based on any of the aspects described in connection with FIGS. 15-17.

In some aspects, the multiple slot PUSCH transmission may be transmitted in a transmission occasion comprising a set of contiguous slots, e.g., option (a) of FIG. 4, and applying the processing timeline may include applying the processing timeline based on a start of an overlapping slot of the multiple slot PUSCH transmission that overlaps with the UCI and in which the UCI is multiplexed, e.g., as illustrated at 2608. In some aspects, the processing timeline may be based on the start of an overlapped slot of the multiple slot PUSCH transmission based on one or more of: the UCI being multiplexed in the overlapped slot of the multiple slot PUSCH transmission, a slot based multiplexing for the UCI within the multiple slot PUSCH transmission, a slot based interleaving for the multiple slot PUSCH transmission, or a slot based rate matching for the multiple slot PUSCH transmission. The reference time $S_{02}$ in FIG. 16 illustrates an example of the processing timeline being based on the start of an overlapping slot.

In some aspects, the UE may multiplex UCI from multiple PUCCHs overlapping the multiple slot PUSCH. For example, as described in connection with any of FIGS. 18-21, the UE may multiplex a first UCI and a second UCI that overlap with the multiple slot PUSCH transmission. The UE may apply a processing timeline, at 2602, for the first UCI and the second UCI based on a start of the multiple slot PUSCH transmission, e.g., as shown by $S_{01}$ in FIG. 21.

In some aspects, the first UCI and the second UCI may overlap in different slots of the transmission occasion, and the processing timeline may be determined differently for the first UCI and the second UCI based on a respective slot of the transmission occasion that is overlapped by the first UCI and the second UCI, e.g., as shown by $S_{02}$ in FIG. 21. In some aspects, the first UCI and the second UCI may be multiplexed across contiguous slots of the transmission occasion.

In some aspects, the multiple slot PUSCH transmission may be transmitted in a transmission occasion comprising a set of non-contiguous slots, e.g., option (b) in FIG. 4, and the processing timeline may be based on a contiguous portion of the transmission occasion in which the UCI is multiplexed, at 2610. FIG. 24 illustrates an example of a processing timeline (e.g., timeline1) that is based on the segment of overlap. The processing timeline may be based on a start of the contiguous portion, e.g., as shown by $S_{01}$ in FIG. 21. In some aspects, the UE may multiplex a first UCI and a second UCI that overlap with different contiguous portions of the multiple slot PUSCH transmission, the processing timeline may be based on the contiguous portion of the transmission occasion in which a respective UCI is multiplexed.

At 2603, the UE multiplexes UCI in at least one slot of a multiple slot PUSCH transmission. As described in connection with FIG. 25, the UE may determine to multiplex the UCI based on a resource on which the UCI is to be transmitted overlapping in time with the transmission occasion for the PUSCH transmission. The multiplexing may include any of the aspects described in connection with FIGS. 4-25. The multiplexing may be performed, e.g., by the UCI multiplexer component 2740 of the apparatus 2702 in FIG. 27.

Figure 27:
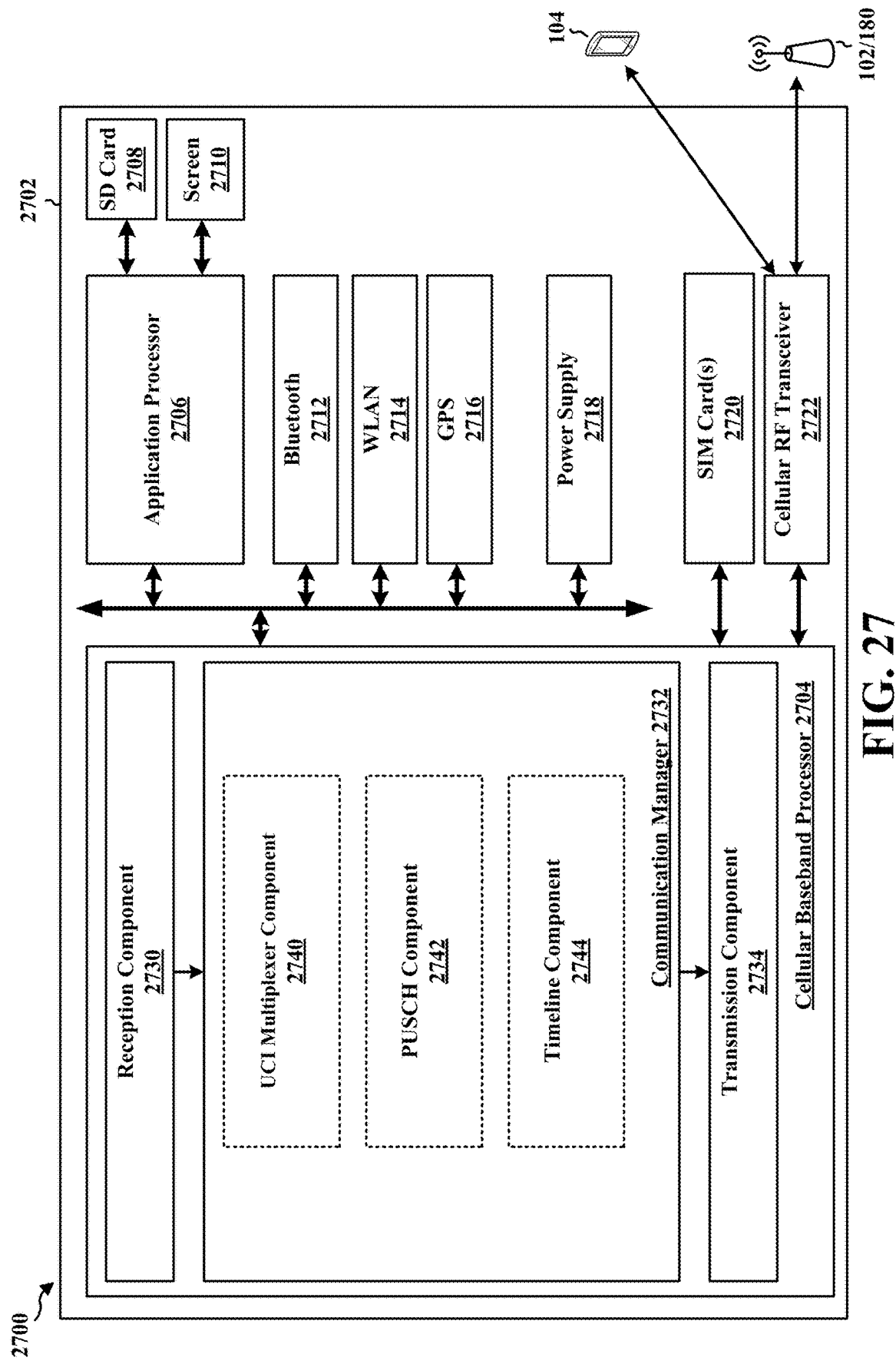
FIG. 27 is a diagram illustrating an example of a hardware implementation for an example apparatus, in accordance with various aspects of the present disclosure.

FIG. 27 is a diagram 2700 illustrating an example of a hardware implementation for an apparatus 2702. The apparatus 2702 may be a UE, a component of a UE, or may implement UE functionality. In some aspects, the apparatus 2702 may include a cellular baseband processor 2704 (also referred to as a modem) coupled to a cellular RF transceiver 2722. The apparatus 2702 may further include one or more subscriber identity modules (SIM) cards 2720, an application processor 2706 coupled to a secure digital (SD) card 2708 and a screen 2710, a Bluetooth module 2712, a wireless local area network (WLAN) module 2714, a Global Positioning System (GPS) module 2716, and/or a power supply 2718. The cellular baseband processor 2704 communicates through the cellular RF transceiver 2722 with the UE 104 and/or base station 102/180. The cellular baseband processor 2704 may include a computer-readable medium/memory. The computer-readable medium/memory may be non-transitory. The cellular baseband processor 2704 is responsible for general processing, including the execution of software stored on the computer-readable medium/memory. The software, when executed by the cellular baseband processor 2704, causes the cellular baseband processor 2704 to perform the various functions described herein. The computer-readable medium/memory may also be used for storing data that is manipulated by the cellular baseband processor 2704 when executing software. The cellular baseband processor 2704 further includes a reception component 2730, a communication manager 2732, and a transmission component 2734. The communication manager 2732 includes the one or more illustrated components. The components within the communication manager 2732 may be stored in the computer-readable medium/memory and/or configured as hardware within the cellular baseband processor 2704. The cellular baseband processor 2704 may be a component of the UE 350 and may include the memory 360 and/or at least one of the TX processor 368, the RX processor 356, and the controller/processor 359. In one configuration, the apparatus 2702 may be a modem chip and include just the baseband processor 2704, and in another configuration, the apparatus 2702 may be the entire UE (e.g., see 350 of FIG. 3) and include the additional modules of the apparatus 2702.

The communication manager 2732 includes a UCI multiplexer component 2740 that is configured to multiplex UCI in at least one slot of a multiple slot PUSCH transmission, e.g., as described in connection with 2603 in FIG. 26B. The communication manager 2732 further includes a PUSCH component 2742 that is configured to transmit the multiple slot PUSCH transmission with multiplexed UCI based on the processing timeline being satisfied, e.g., as described in connection with 2604 in FIG. 26A or 26B. The communication manager 2732 further includes a timeline component 2744 that is configured to apply a processing timeline for multiplexing UCI in at least one slot of a multiple slot PUSCH transmission, e.g., as described in connection with 2602 in FIG. 26A or 26B.

The apparatus may include additional components that perform each of the blocks of the algorithm in the flowcharts of FIGS. 26A, 26B, and/or the aspects performed by the UE in FIG. 25. As such, each block in the flowcharts of FIGS. 26A, 26B, and/or the aspects performed by the UE in FIG. 25 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 2702, and in particular the cellular baseband processor 2704, includes means for applying a processing timeline for multiplexing UCI in at least one slot of a multiple slot PUSCH transmission and means for transmitting the multiple slot PUSCH transmission with multiplexed UCI based on the processing timeline being satisfied. The apparatus may further include means for multiplexing the UCI within at least one slot of the multiple slot PUSCH transmission. The means may be one or more of the components of the apparatus 2702 configured to perform the functions recited by the means. As described herein, the apparatus 2702 may include the TX Processor 368, the RX Processor 356, and the controller/processor 359. As such, in one configuration, the means may be the TX Processor 368, the RX Processor 356, and the controller/processor 359 configured to perform the functions recited by the means.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 28:
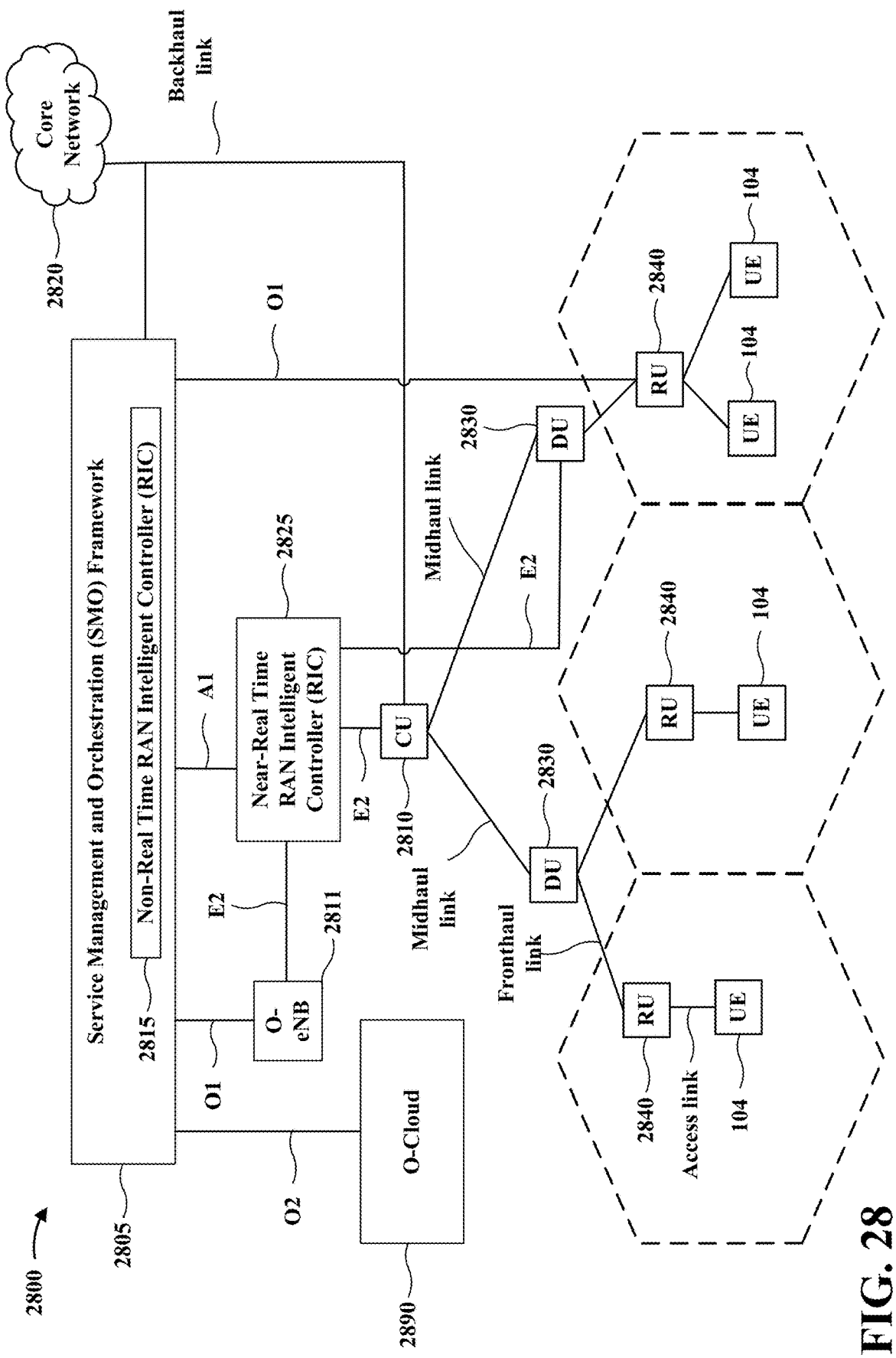
FIG. 28 is a diagram illustrating an example disaggregated base station architecture.

FIG. 28 shows a diagram illustrating an example disaggregated base station 2800 architecture. The disaggregated base station 2800 architecture may include one or more central units (CUs) 2810 that can communicate directly with a core network 2820 via a backhaul link, or indirectly with the core network 2820 through one or more disaggregated base station units (such as a Near-Real Time (Near-RT) RAN Intelligent Controller (RIC) 2825 via an E2 link, or a Non-Real Time (Non-RT) RIC 2815 associated with a Service Management and Orchestration (SMO) Framework 2805, or both). A CU 2810 may communicate with one or more distributed units (DUs) 2830 via respective midhaul links, such as an F1 interface. The DUs 2830 may communicate with one or more radio units (RUs) 2840 via respective fronthaul links. The RUs 2840 may communicate with respective UEs 104 via one or more radio frequency (RF) access links. In some implementations, the UE 104 may be simultaneously served by multiple RUs 2840.

Each of the units, i.e., the CUs 2810, the DUs 2830, the RUs 2840, as well as the Near-RT RICs 2825, the Non-RT RICs 2815 and the SMO Framework 2805, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 2810 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 2810. The CU 2810 may be configured to handle user plane functionality (i.e., Central Unit-User Plane (CU-UP)), control plane functionality (i.e., Central Unit-Control Plane (CU-CP)), or a combination thereof. In some implementations, the CU 2810 can be logically split into one or more CU-UP units and one or more CU-CP units. The CU-UP unit can communicate bidirectionally with the CU-CP unit via an interface, such as the E 1 interface when implemented in an O-RAN configuration. The CU 2810 can be implemented to communicate with the DU 2830, as necessary, for network control and signaling.

The DU 2830 may correspond to a logical unit that includes one or more base station functions to control the operation of one or more RUs 2840. In some aspects, the DU 2830 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 2830 may further host one or more low PHY layers. Each layer (or module) can be implemented with an interface configured to communicate signals with other layers (and modules) hosted by the DU 2830, or with the control functions hosted by the CU 2810.

Lower-layer functionality can be implemented by one or more RUs 2840. In some deployments, an RU 2840, controlled by a DU 2830, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 2840 can be implemented to handle over the air (OTA) communication with one or more UEs 104. In some implementations, real-time and non-real-time aspects of control and user plane communication with the RU(s) 2840 can be controlled by the corresponding DU 2830. In some scenarios, this configuration can enable the DU(s) 2830 and the CU 2810 to be implemented in a cloud-based RAN architecture, such as a vRAN architecture.

The SMO Framework 2805 may be configured to support RAN deployment and provisioning of non-virtualized and virtualized network elements. For non-virtualized network elements, the SMO Framework 2805 may be configured to support the deployment of dedicated physical resources for RAN coverage requirements which may be managed via an operations and maintenance interface (such as an O1 interface). For virtualized network elements, the SMO Framework 2805 may be configured to interact with a cloud computing platform (such as an open cloud (O-Cloud) 2890) to perform network element life cycle management (such as to instantiate virtualized network elements) via a cloud computing platform interface (such as an O2 interface). Such virtualized network elements can include, but are not limited to, CUs 2810, DUs 2830, RUs 2840 and Near-RT RICs 2825. In some implementations, the SMO Framework 2805 can communicate with a hardware aspect of a 4G RAN, such as an open eNB (O-eNB) 2811, via an O1 interface. Additionally, in some implementations, the SMO Framework 2805 can communicate directly with one or more RUs 2840 via an O1 interface. The SMO Framework 2805 also may include a Non-RT RIC 2815 configured to support functionality of the SMO Framework 2805.

The Non-RT RIC 2815 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 2825. The Non-RT RIC 2815 may be coupled to or communicate with (such as via an A1 interface) the Near-RT RIC 2825. The Near-RT RIC 2825 may be configured to include a logical function that enables near-real-time control and optimization of RAN elements and resources via data collection and actions over an interface (such as via an E2 interface) connecting one or more CUs 2810, one or more DUs 2830, or both, as well as an O-eNB, with the Near-RT RIC 2825.

In some implementations, to generate AI/ML models to be deployed in the Near-RT RIC 2825, the Non-RT RIC 2815 may receive parameters or external enrichment information from external servers. Such information may be utilized by the Near-RT RIC 2825 and may be received at the SMO Framework 2805 or the Non-RT RIC 2815 from non-network data sources or from network functions. In some examples, the Non-RT RIC 2815 or the Near-RT RIC 2825 may be configured to tune RAN behavior or performance. For example, the Non-RT RIC 2815 may monitor long-term trends and patterns for performance and employ AI/ML models to perform corrective actions through the SMO Framework 2805 (such as reconfiguration via O1) or via creation of RAN management policies (such as A1 policies).

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a UE, comprising: applying a processing timeline for multiplexing UCI in at least one slot of a multiple slot PUSCH transmission; and transmitting the multiple slot PUSCH transmission with multiplexed UCI based on the processing timeline being satisfied.

In aspect 2, the method of aspect 1 further includes that the UCI comprises HARQ feedback, and the processing timeline corresponds to a time gap between reception of a PDSCH and a start of a PUCCH carrying a HARQ feedback payload for the PDSCH.

In aspect 3, the method of aspect 1 further includes that the UCI comprises a CSI report, and the processing timeline corresponds to a time gap between reception of a last symbol of a CSI-RS and a start of a PUCCH carrying the CSI report based on measurement of the CSI-RS.

In aspect 4, the method of any of aspects 1-3 further includes that applying the processing timeline includes: applying the processing timeline based on a start of the multiple slot PUSCH transmission.

In aspect 5, the method of any of aspects 1-4 further includes that the multiple slot PUSCH transmission is transmitted in a transmission occasion comprising a set of contiguous slots.

In aspect 6, the method of any of aspects 1-5 further includes that the processing timeline is based on the start of the multiple slot PUSCH transmission based on one or more of: an overlapped slot of the multiple slot PUSCH transmission that overlaps in time with the UCI, a multiplexing slot in which the UCI is to be multiplexed in the multiple slot PUSCH transmission, a transmission occasion based multiplexing for the UCI within the multiple slot PUSCH transmission, a transmission occasion based interleaving for the multiple slot PUSCH transmission, or a transmission occasion based rate matching for the multiple slot PUSCH transmission.

In aspect 7, the method of any of aspects 1-5 further includes that the processing timeline is based on the start of an overlapped slot of the multiple slot PUSCH transmission based on one or more of: the UCI being multiplexed in the overlapped slot of the multiple slot PUSCH transmission, a slot based multiplexing for the UCI within the multiple slot PUSCH transmission, a slot based interleaving for the multiple slot PUSCH transmission, or a slot based rate matching for the multiple slot PUSCH transmission.

In aspect 8, the method of any of aspects 1-7 further includes, wherein multiplexing the UCI includes: multiplexing a first UCI and a second UCI that overlap with the multiple slot PUSCH transmission.

In aspect 9, the method of aspect 8 further includes applying the processing timeline for the first UCI and the second UCI based on a start of the multiple slot PUSCH transmission.

In aspect 10, the method of aspect 8 further includes that the first UCI and the second UCI overlap in different slots of a transmission occasion, and the processing timeline is determined differently for the first UCI and the second UCI based on a respective slot of the transmission occasion that is overlapped by the first UCI and the second UCI.

In aspect 11, the method of any of aspects 1-3 further includes that the multiple slot PUSCH transmission is transmitted in a transmission occasion comprising a set of non-contiguous slots, wherein the processing timeline is determined based on a contiguous portion of the transmission occasion in which the UCI is multiplexed.

In aspect 12, the method of aspect 11 further includes that the processing timeline is based on a start of the contiguous portion.

In aspect 13, the method of aspect 11 or aspect 12 further includes multiplexing a first UCI and a second UCI that overlap with different contiguous portions of the multiple slot PUSCH transmission, wherein the processing timeline is determined based on the contiguous portion of the transmission occasion in which a respective UCI is multiplexed.

Aspect 14 is an apparatus for wireless communication at a user equipment UE, comprising: a memory; and at least one processor coupled to the memory and configured to: apply a processing timeline for multiplexing UCI in at least one slot of a multiple slot PUSCH transmission; and transmit the multiple slot PUSCH transmission with multiplexed UCI based on the processing timeline being satisfied.

In aspect 15, the apparatus for wireless communication of aspect 14, includes the memory and the at least one processor that are further configured to perform the method of any of aspects 2-13.

In aspect 16, the apparatus of any of aspect 14 or 15 further includes at least one transceiver coupled to the at least one processor.

In aspect 17, the apparatus of any of aspects 14-16 further includes at least one antenna coupled to the at least one processor.

Aspect 18 is an apparatus for wireless communication at a UE, comprising: means for applying a processing timeline for multiplexing UCI in at least one slot of a multiple slot PUSCH transmission; and means for transmitting the multiple slot PUSCH transmission with multiplexed UCI based on the processing timeline being satisfied.

In aspect 19, the apparatus for wireless communication of aspect 18, further comprises means to perform the method of any of claims 2-13.

In aspect 20, the apparatus of any of aspect 18 or 19 further includes at least one transceiver.

In aspect 21, the apparatus of any of aspects 18-20 further includes at least one antenna.

Aspect 22 is a non-transitory computer-readable medium storing computer executable code at a UE, the code when executed by a processor causes the processor to: apply a processing timeline for multiplexing UCI in at least one slot of a multiple slot PUSCH transmission; and transmit the multiple slot PUSCH transmission with multiplexed UCI based on the processing timeline being satisfied.

In aspect 23, the computer-readable medium of aspect 22, further comprises code that when executed by the processor causes the processor to perform the method of any of claims 2-13.

What is claimed is:

1. A method of wireless communication at a user equipment (UE), comprising:
    applying a processing timeline for multiplexing uplink control information (UCI) in at least one slot of a multiple slot physical uplink shared channel (PUSCH) transmission; and
    transmitting the multiple slot PUSCH transmission with multiplexed UCI based on the processing timeline being satisfied, wherein the processing timeline is based on:
        a start of the multiple slot PUSCH transmission based on one or more of a transmission occasion based interleaving for the multiple slot PUSCH transmission or a transmission occasion based rate matching for the multiple slot PUSCH transmission, or
        a start of an overlapped slot of the multiple slot PUSCH transmission based on one or more of a slot based interleaving for the multiple slot PUSCH transmission or a slot based rate matching for the multiple slot PUSCH transmission.

2. The method of claim 1, wherein the UCI comprises hybrid automatic repeat request (HARQ) feedback, and the processing timeline corresponds to a time gap between reception of a physical downlink shared channel (PDSCH) and a start of a physical uplink control channel (PUCCH) carrying a HARQ feedback payload for the PDSCH.

3. The method of claim 1, wherein the UCI comprises a channel state information (CSI) report, and the processing timeline corresponds to a time gap between reception of a last symbol of a channel state information reference signal (CSI-RS) and a start of a physical uplink control channel (PUCCH) carrying the CSI report based on measurement of the CSI-RS.

4. The method of claim 1, wherein applying the processing timeline includes:
applying the processing timeline based on the start of the multiple slot PUSCH transmission based on the one or more of the transmission occasion based interleaving for the multiple slot PUSCH transmission or the transmission occasion based rate matching for the multiple slot PUSCH transmission.

5. The method of claim 4, wherein the multiple slot PUSCH transmission is transmitted in a transmission occasion comprising a set of contiguous slots.

6. The method of claim 5, wherein the processing timeline is further based on the start of the multiple slot PUSCH transmission based on one or more of:
the overlapped slot of the multiple slot PUSCH transmission that overlaps in time with the UCI,
a multiplexing slot in which the UCI is to be multiplexed in the multiple slot PUSCH transmission, or
a transmission occasion based multiplexing for the UCI within the multiple slot PUSCH transmission.

7. The method of claim 1, wherein multiplexing the UCI includes:
multiplexing a first UCI and a second UCI that overlap with the multiple slot PUSCH transmission.

8. The method of claim 7, further comprising:
applying the processing timeline for the first UCI and the second UCI based on the start of the multiple slot PUSCH transmission.

9. The method of claim 7, wherein the first UCI and the second UCI overlap in different slots of a transmission occasion, and the processing timeline is determined differently for the first UCI and the second UCI based on a respective slot of the transmission occasion that is overlapped by the first UCI and the second UCI.

10. The method of claim 1, wherein the multiple slot PUSCH transmission is transmitted in a transmission occasion comprising a set of non-contiguous slots, wherein the processing timeline is determined based on a contiguous portion of the transmission occasion in which the UCI is multiplexed.

11. The method of claim 10, wherein the processing timeline is based on a start of the contiguous portion.

12. The method of claim 10, further comprising:
multiplexing a first UCI and a second UCI that overlap with different contiguous portions of the multiple slot PUSCH transmission, wherein the processing timeline is determined based on the contiguous portion of the transmission occasion in which a respective UCI is multiplexed.

13. The method of claim 1, wherein the processing timeline is based on the start of the overlapped slot of the multiple slot PUSCH transmission based on the one or more of the slot based interleaving for the multiple slot PUSCH transmission, or the slot based rate matching for the multiple slot PUSCH transmission.

14. The method of claim 1, wherein the processing timeline is based on the start of the overlapped slot of the multiple slot PUSCH transmission further based on one or more of:
the UCI being multiplexed in the overlapped slot of the multiple slot PUSCH transmission, or
a slot based multiplexing for the UCI within the multiple slot PUSCH transmission.

15. An apparatus for wireless communication at a user equipment (UE), comprising:
a memory; and
at least one processor coupled to the memory and configured to:
apply a processing timeline for multiplexing uplink control information (UCI) in at least one slot of a multiple slot physical uplink shared channel (PUSCH) transmission; and
transmit the multiple slot PUSCH transmission with multiplexed UCI based on the processing timeline being satisfied, wherein the processing timeline is based on:
a start of the multiple slot PUSCH transmission based on one or more of a transmission occasion based interleaving for the multiple slot PUSCH transmission or a transmission occasion based rate matching for the multiple slot PUSCH transmission, or
a start of an overlapped slot of the multiple slot PUSCH transmission based on one or more of a slot based interleaving for the multiple slot PUSCH transmission or a slot based rate matching for the multiple slot PUSCH transmission.

16. The apparatus of claim 15, wherein the UCI comprises hybrid automatic repeat request (HARQ) feedback, and the processing timeline corresponds to a time gap between reception of a physical downlink shared channel (PDSCH) and a start of a physical uplink control channel (PUCCH) carrying a HARQ feedback payload for the PDSCH.

17. The apparatus of claim 15, wherein the UCI comprises a channel state information (CSI) report, and the processing timeline corresponds to a time gap between reception of a last symbol of a channel state information reference signal (CSI-RS) and a start of a physical uplink control channel (PUCCH) carrying the CSI report based on measurement of the CSI-RS.

18. The apparatus of claim 15, wherein to apply the processing timeline, the at least one processor is further configured to:
apply the processing timeline based on the start of the multiple slot PUSCH transmission based on the one or more of the transmission occasion based interleaving for the multiple slot PUSCH transmission or the transmission occasion based rate matching for the multiple slot PUSCH transmission.

19. The apparatus of claim 18, wherein the multiple slot PUSCH transmission is transmitted in a transmission occasion comprising a set of contiguous slots.

20. The apparatus of claim 19, wherein the processing timeline is further based on the start of the multiple slot PUSCH transmission based on one or more of:
the overlapped slot of the multiple slot PUSCH transmission that overlaps in time with the UCI,
a multiplexing slot in which the UCI is to be multiplexed in the multiple slot PUSCH transmission, or
a transmission occasion based multiplexing for the UCI within the multiple slot PUSCH transmission.

21. The apparatus of claim 15, wherein to multiplex the UCI, the at least one processor is further configured to:
multiplex a first UCI and a second UCI that overlap with the multiple slot PUSCH transmission.

22. The apparatus of claim 21, wherein the at least one processor is further configured to:
apply the processing timeline for the first UCI and the second UCI based on the start of the multiple slot PUSCH transmission.

23. The apparatus of claim 21, wherein the first UCI and the second UCI overlap in different slots of a transmission occasion, and the processing timeline is determined differently for the first UCI and the second UCI based on a respective slot of the transmission occasion that is overlapped by the first UCI and the second UCI.

24. The apparatus of claim 15, wherein the multiple slot PUSCH transmission is in a transmission occasion comprising a set of non-contiguous slots, wherein the processing timeline is based on a contiguous portion of the transmission occasion in which the UCI is multiplexed.

25. The apparatus of claim 24, wherein the processing timeline is based on a start of the contiguous portion.

26. The apparatus of claim 24, wherein the at least one processor is further configured to:
   multiplex a first UCI and a second UCI that overlap with different contiguous portions of the multiple slot PUSCH transmission, wherein the processing timeline is determined based on the contiguous portion of the transmission occasion in which a respective UCI is multiplexed.

27. The apparatus of claim 15, further comprising:
   at least one transceiver coupled to the at least one processor.

28. The apparatus of claim 15, wherein the processing timeline is based on the start of the overlapped slot of the multiple slot PUSCH transmission further based on one or more of:
   the UCI being multiplexed in the overlapped slot of the multiple slot PUSCH transmission, or
   a slot based multiplexing for the UCI within the multiple slot PUSCH transmission.

29. An apparatus for wireless communication at a user equipment (UE), comprising:
   means for applying a processing timeline for multiplexing uplink control information (UCI) in at least one slot of a multiple slot physical uplink shared channel (PUSCH) transmission; and
   means for transmitting the multiple slot PUSCH transmission with multiplexed UCI based on the processing timeline being satisfied, wherein the processing timeline is based on:
      a start of the multiple slot PUSCH transmission based on one or more of a transmission occasion based interleaving for the multiple slot PUSCH transmission or a transmission occasion based rate matching for the multiple slot PUSCH transmission, or
      a start of an overlapped slot of the multiple slot PUSCH transmission based on one or more of a slot based interleaving for the multiple slot PUSCH transmission or a slot based rate matching for the multiple slot PUSCH transmission.

30. A non-transitory computer-readable medium storing computer executable code at a user equipment (UE), the code when executed by a processor causes the processor to:
   apply a processing timeline for multiplexing uplink control information (UCI) in at least one slot of a multiple slot physical uplink shared channel (PUSCH) transmission; and
   transmit the multiple slot PUSCH transmission with multiplexed UCI based on the processing timeline being satisfied, wherein the processing timeline is based on:
      a start of the multiple slot PUSCH transmission based on one or more of a transmission occasion based interleaving for the multiple slot PUSCH transmission or a transmission occasion based rate matching for the multiple slot PUSCH transmission, or
      a start of an overlapped slot of the multiple slot PUSCH transmission based on one or more of a slot based interleaving for the multiple slot PUSCH transmission or a slot based rate matching for the multiple slot PUSCH transmission.

* * * * *